(12) United States Patent
Luo

(10) Patent No.: US 10,306,212 B2
(45) Date of Patent: May 28, 2019

(54) METHODS AND SYSTEMS FOR CAPTURING A PLURALITY OF THREE-DIMENSIONAL SUB-FRAMES FOR USE IN FORMING A VOLUMETRIC FRAME OF A REAL-WORLD SCENE

(71) Applicant: Verizon Patent and Licensing Inc., Arlington, VA (US)

(72) Inventor: Liang Luo, Piscataway Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 15/476,782

(22) Filed: Mar. 31, 2017

(65) Prior Publication Data

US 2018/0288390 A1    Oct. 4, 2018

(51) Int. Cl.
*H04N 13/204*    (2018.01)
*H04N 13/296*    (2018.01)

(52) U.S. Cl.
CPC ......... *H04N 13/296* (2018.05); *H04N 13/204* (2018.05)

(58) Field of Classification Search
CPC .................... H04N 13/296; H04N 13/204
See application file for complete search history.

(56) References Cited

U.S. PATENT DOCUMENTS

| | | | | |
|---|---|---|---|---|
| 5,850,352 A * | 12/1998 | Moezzi | ................ | H04N 13/139 345/419 |
| 9,113,068 B1 * | 8/2015 | Whitson | ............ | H04N 5/23206 |
| 9,369,689 B1 * | 6/2016 | Tran | ........................ | G06T 7/593 |
| 9,785,150 B2 * | 10/2017 | Sibenac | ................ | B60W 30/08 |
| 2008/0117311 A1 * | 5/2008 | Panabaker | ........... | H04N 1/3876 348/231.5 |
| 2008/0292211 A1 * | 11/2008 | Frantz | ................ | G01N 21/8806 382/284 |
| 2012/0162379 A1 * | 6/2012 | Dahi | .................. | H04N 5/23254 348/47 |
| 2014/0156871 A1 * | 6/2014 | Chandrasekaran | ... | G06F 13/102 710/5 |

(Continued)

FOREIGN PATENT DOCUMENTS

WO    WO-2013187203 A1 * 12/2013    ............. G01B 11/25

*Primary Examiner* — Jamie J Atala
*Assistant Examiner* — Michael Robert Cammarata

(57) ABSTRACT

An exemplary volumetric frame capture controller ("controller") transmits first and second commands to first and second three-dimensional ("3D") capture devices disposed, respectively, at first and second positions with respect to a real-world scene. The first and second commands are to capture, respectively, first and second 3D sub-frames representative of the real-world scene from first and second vantage points associated with the first and second positions. Based on the first and second commands, the controller receives the first and second 3D sub-frames and, in response, determines that a first timestamp associated with a capture of the first 3D sub-frame is less than a predefined time threshold from a second timestamp associated with a capture of the second 3D sub-frame. In response to this determination, the controller provides the first and second 3D sub-frames for use in forming a volumetric frame of the real-world scene. Corresponding methods and systems are also disclosed.

20 Claims, 11 Drawing Sheets

(56) References Cited

U.S. PATENT DOCUMENTS

| | | | |
|---|---|---|---|
| 2015/0054913 A1* | 2/2015 | Annau | G11B 27/11 348/36 |
| 2015/0348580 A1* | 12/2015 | van Hoff | G11B 19/20 348/38 |
| 2016/0088287 A1* | 3/2016 | Sadi | H04N 13/254 348/43 |
| 2017/0345216 A1* | 11/2017 | Boyle | G06T 7/20 |
| 2018/0088584 A1* | 3/2018 | Tascione | G05D 1/0231 |
| 2018/0115533 A1* | 4/2018 | Wielicki | G06F 13/4282 |
| 2018/0205926 A1* | 7/2018 | Mogalapalli | G06T 7/521 |

\* cited by examiner

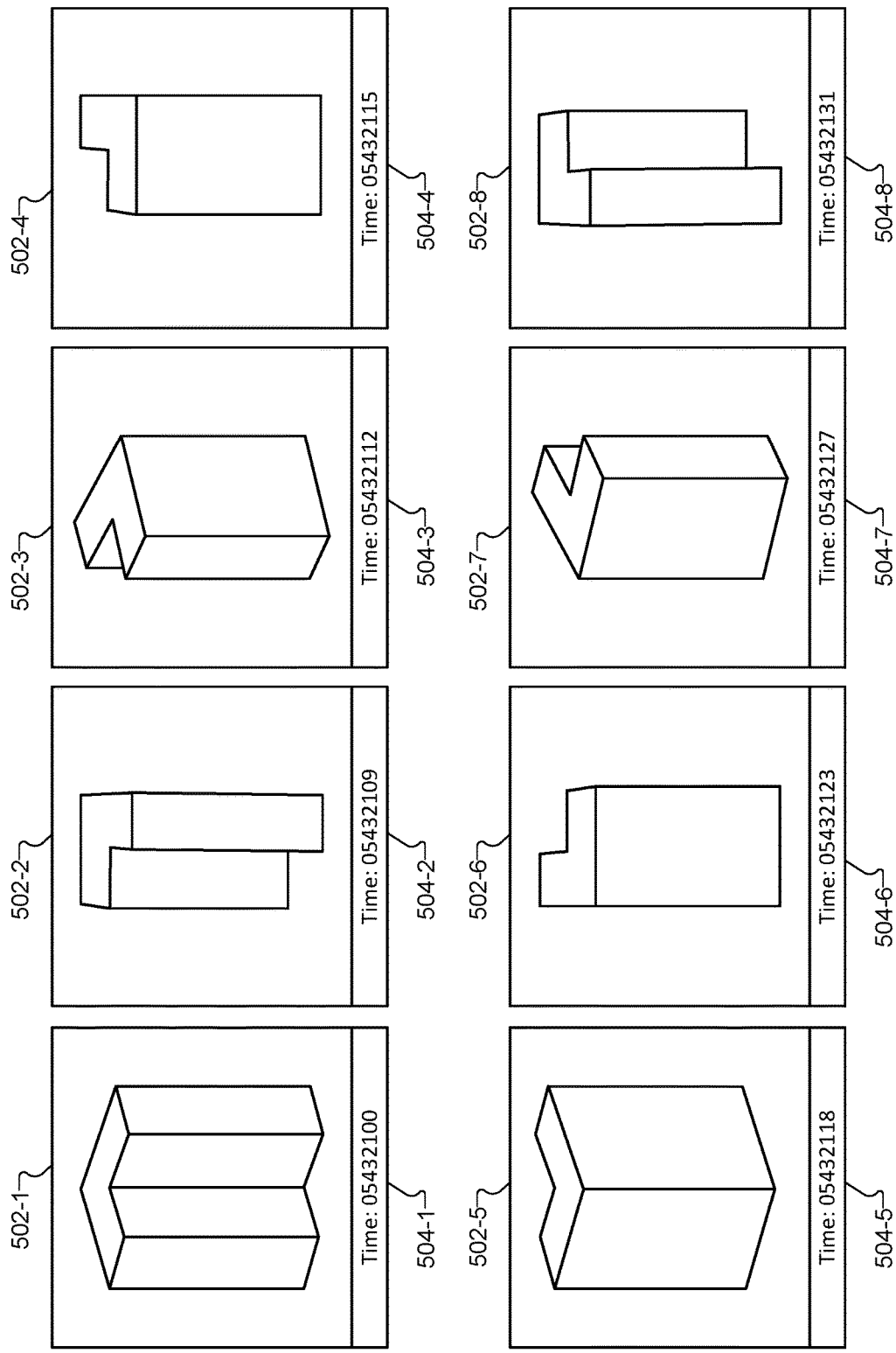

METHODS AND SYSTEMS FOR CAPTURING A PLURALITY OF THREE-DIMENSIONAL SUB-FRAMES FOR USE IN FORMING A VOLUMETRIC FRAME OF A REAL-WORLD SCENE

BACKGROUND INFORMATION

Data representative of real-world scenes (i.e., scenes that include places and things existing in the real world, as opposed to scenes that are entirely virtual, imaginary, computer generated, or the like) may be captured for use in various applications. For example, video data and/or other types of data representative of a real-world scene may be captured to generate a recreation or model of the real-world scene for entertainment, manufacturing, educational, and/or other types of applications.

Virtual reality media content is one example of an application where data representative of real-world scenes may be captured. Virtual reality media content may be used to immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction, giving the user a sense that he or she is actually present in and experiencing the immersive virtual reality world from a particular vantage point within the immersive virtual reality world. In some examples, virtual reality media content may be generated to represent immersive virtual reality worlds that are based on data (e.g., video data, audio data, etc.) of real-world scenes captured using one or more capture devices (e.g., video cameras, etc.).

Unfortunately, current methods of capturing data representative of real-world scenes may have various drawbacks and limitations, particularly when several distinct capture devices are used to simultaneously capture data representative of the same real-world scene. For example, when a plurality of capture devices provide captured video data representative of the real-world scene (e.g., video data representing different parts of the real-world scene, video data representing the real-world scene from different vantage points, etc.) to a central processing server concurrently, the server may have to expend significant processing resources organizing, sorting, ordering, synchronizing, and otherwise processing and preparing the incoming data prior to being able to combine or otherwise make use of the data captured by the different capture devices (e.g., to generate virtual reality media content or the like).

Additionally, even if powerful computing resources (e.g., very fast processors, etc.) are available to perform the organizing, sorting, ordering, synchronizing, and other processing described above, it may be difficult or impractical to scale such resources upward in the event that system requirements change and evolve. For example, conventional techniques used to capture data representative of a real-world scene in one implementation may not necessarily scale up to capture a larger real-world scene, to capture the real-world scene using a larger number of capture devices, to capture the real-world scene at a higher capture quality (e.g., video resolution, etc.), or the like.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 illustrates exemplary graphical depictions of data representative of a plurality of 3D sub-frames of a real-world scene captured by 3D capture devices disposed at a plurality of fixed positions surrounding the real-world scene according to principles described herein.

DETAILED DESCRIPTION OF PREFERRED EMBODIMENTS

Figure 1:
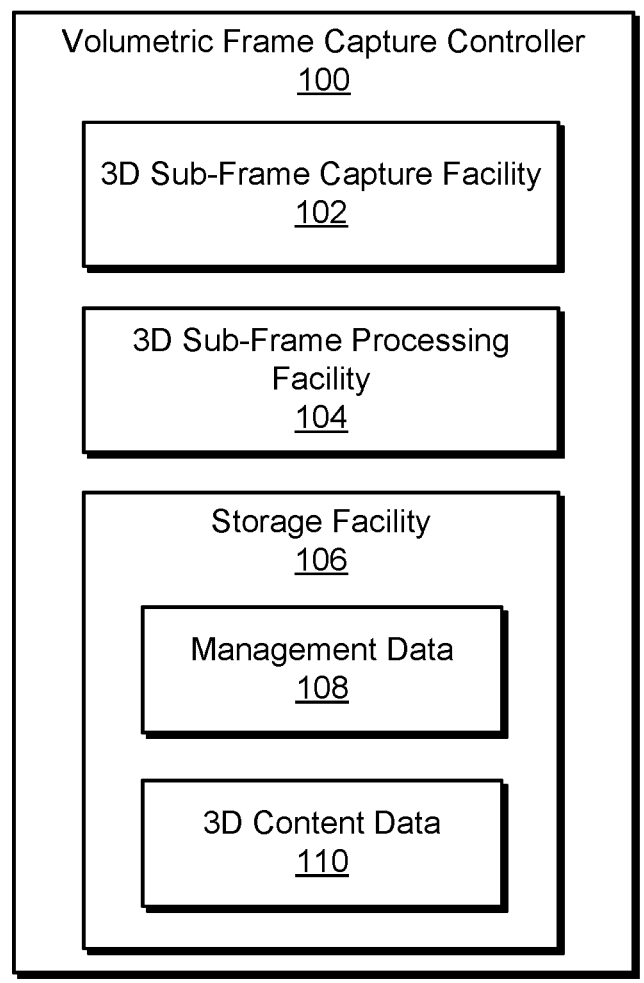
FIG. 1 illustrates an exemplary volumetric frame capture controller for capturing a plurality of three-dimensional ("3D") sub-frames for use in forming a volumetric frame of a real-world scene according to principles described herein.

Methods and systems for capturing a plurality of three-dimensional ("3D") sub-frames for use in forming a volumetric frame of a real-world scene are described herein. For example, one or more volumetric frame capture controllers included within an exemplary volumetric frame capture system may perform an exemplary method for capturing a plurality of 3D sub-frames for use in forming a volumetric frame of a real-world scene as follows. A volumetric frame capture controller may transmit, to a 3D capture device disposed at a first fixed position with respect to a real-world scene, a first command to capture a first 3D sub-frame representative of the real-world scene from a first vantage point (i.e., viewpoint, viewing angle, etc.) associated with the first fixed position. For example, the 3D capture device may be disposed at a fixed position within or near the real-world scene that provides a suitable vantage point from which to view the real-world scene, and may include one or more components configured to capture video data, depth data, audio data, metadata, and/or other suitable types of data representative of the real-world scene from the perspective of the first vantage point. Based on the first command, the volumetric frame capture controller may receive the first 3D sub-frame (e.g., which may include image data, depth data, etc., captured from the first vantage point) from the first 3D capture device.

The volumetric frame capture controller may further transmit, to a second 3D capture device disposed at a second fixed position with respect to the real-world scene, a second command to capture a second 3D sub-frame representative of the real-world scene from a second vantage point associated with the second fixed position. Based on the second command, the volumetric frame capture controller may receive the second 3D sub-frame from the second 3D capture device.

In response to receiving the first and second 3D sub-frames (e.g., as well as, in certain examples, various other 3D sub-frames), the volumetric frame capture controller may determine that a first timestamp associated with a capture of the first 3D sub-frame is less than a predefined time threshold from a second timestamp associated with a capture of the second 3D sub-frame. For example, as will be described in more detail below, the predefined time threshold may relate to an operational parameter of the volumetric frame capture controller such as a parameter requiring the controller to provide a particular number of frames per second, or the like.

As such, when the first timestamp is determined to be less than the predefined time threshold from the second timestamp, the volumetric frame capture controller may correlate the first and second 3D sub-frames by, for example, treating the 3D sub-frames as if they were captured simultaneously. Specifically, for instance, in response to the determination that the first timestamp is less than the predefined time threshold from the second timestamp, the volumetric frame capture controller may provide the first and second 3D sub-frames for use in forming a volumetric frame of the real-world scene (e.g., by aligning the first and second 3D sub-frames based on one or more predetermined alignment parameters or by distributing, rendering, combining, or otherwise processing the first and second 3D sub-frames).

As will be described in more detail below, the providing of the first and second 3D sub-frames for use in forming a volumetric frame of the real-world scene may include providing the first and second 3D sub-frames to the volumetric frame capture controller (e.g., to the same or a different facility within the volumetric frame capture controller as the facility or facilities that performed the operations described above) such that the volumetric frame capture controller may perform additional operations to form the volumetric frame. For example, the volumetric frame capture controller may align the first and second 3D sub-frames to form the volumetric frame and/or perform other such operations to combine, render, and/or otherwise process the first and second 3D sub-frames to form a volumetric frame. In other examples, the volumetric frame capture controller may provide the first and second 3D sub-frames to another system (e.g., a provider server system, media player device used by a user, etc.) to perform alignment, combining, rendering, and other such operations to form the volumetric frame.

The systems and methods for generating volumetric frames of real-world scenes based on pluralities of 3D sub-frames described herein may provide various advantages and benefits. For example, because the volumetric frame capture controllers described herein exert control over data capture by pulling 3D sub-frames from the plurality of 3D capture devices on the terms and/or timetable of the volumetric frame capture controllers themselves rather than receiving data pushed from the 3D capture devices on the terms and/or timetable of the 3D capture devices, the volumetric frame capture controllers may avoid much processing that would otherwise be required to synchronize and correlate the data in conventional volumetric frame capture systems. The volumetric frame capture controller may avoid, for instance, expending processing time and resources on operations such as organizing 3D sub-frames, sorting 3D sub-frames, ordering 3D sub-frames, synchronizing 3D sub-frames with other 3D sub-frames from other 3D capture devices, and so forth. This may be particularly helpful in relation to applications where real-time capture and processing of 3D sub-frames and volumetric frames is supported and capture and processing operations are required to be performed at a particular rate to keep up with a real-time transmission.

Moreover, the methods and systems described herein provide a frame capture paradigm and hardware infrastructure that significantly enhances the scalability of current frame capture systems. In other frame capture systems, powerful hardware resources (e.g., multiple servers including multiple processing units) are needed to perform the immense processing required for capture, processing, and distribution (e.g., particularly real-time capture, processing, and distribution) of data representative of real-world scenes. To some degree, such systems may be improved by using faster computers with faster processors. However, it is difficult to make significant improvements to a frame capture system (e.g., to double the number of 3D capture devices used, to double the resolution captured by each 3D capture device, to double the frame rate at which 3D sub-frame are captured, etc.) by merely performing the same operations on the same types of hardware infrastructures implemented using faster processors.

Accordingly, as will be described in more detail below, the methods and systems described herein may scale up straightforwardly to meet virtually any frame capture specifications that a capture system might have (e.g., minimum frame rates, minimum resolutions, minimum numbers of vantage points, etc.) by implementing volumetric frame capture systems with a plurality of interoperating volumetric frame capture controllers and associated resources. In this way, computer processing time, memory, bandwidth, and/or other computer resources may be used more optimally even while additional processing resources may easily be added. This allows for larger amounts of higher quality data to be captured, processed, stored, and distributed in less time, thereby helping to create increasingly realistic and rewarding experiences for users benefiting from the data (e.g., in the form of virtual reality media content or the like).

As used herein, a "3D sub-frame" may refer to a combination of one or more types of data representative of a real-world scene from one particular vantage point. For example, a 3D sub-frame may include any combination of image data (e.g., a single frame of color or grayscale video data), depth data, audio data, metadata, and/or other suitable types of data representative of the real-world scene from the perspective of the particular vantage point at a particular moment in time.

As used herein, "image data" or "video data" may broadly include any data representative of how a real-world subject (e.g., a real-world scene, one or more objects within a real-world scene, etc.) may appear at a particular moment in time (image data) or over a particular time period (video data) from a particular vantage point of a 3D capture device capturing the data. Image and video data is not limited to any particular format, file type, frame rate, resolution, quality level, or other characteristic that may be associated with various definitions and/or standards defining the art.

As used herein, "depth data" may broadly include any data representative of a position of a real-world subject (e.g., one or more objects within a real-world scene) in 3D space. As will be described in more detail below, depth data may be determined or captured based on video data (e.g., by combining video data captured from different vantage points using a suitable depth capture technique) or by using techniques that may require additional depth capture equipment and/or data such as specialized depth capture devices that provide time-of-flight data, infrared imaging data, and the like.

As will be described in more detail below, 3D sub-frames may be combined with (e.g., aligned with, stitched together with, etc.) other 3D sub-frames representative of the real-world scene from other vantage points to form volumetric frames representative of the real-world scene from multiple vantage points (e.g., including arbitrary vantage points). As used herein, a "volumetric frame" of a real-world scene refers to data representative of the real-world scene and captured from a plurality of vantage points at a particular moment in time. Thus, as described above, a volumetric frame may be formed from two or more 3D sub-frames. In some examples, the 3D sub-frames forming a volumetric frame may be processed (e.g., aligned, combined, etc.) to generate volumetric models of one or more objects included within the real-world scene. In other examples, a volumetric frame may be composed of a plurality of 3D sub-frames that have not yet been combined together (e.g., video data, depth data, etc., represented within different image or video streams or other data formats) but that may be combined downstream by another device such as an end user media player device.

Regardless, volumetric frames representative of a real-world scene may include sufficient data to allow the real-world scene to be represented (e.g., within virtual reality media content or the like) from multiple vantage points. In some examples, these multiple vantage points may correlate with the specific vantage points from which the specific 3D sub-frames forming the volumetric frame were captured. In other examples, as will be described below, the vantage points from which the volumetric frame may be presented may be arbitrary. In other words, there may be an unlimited number of locations and angles from which the real-world scene may be represented based on the data in the volumetric frame.

As described above, prior to providing 3D sub-frames for use in forming a volumetric frame of a real-world scene, a volumetric frame capture controller may determine that the 3D sub-frames are effectively synchronized by, for example, determining that a first timestamp associated with a capture of a first 3D sub-frame is less than a predefined time threshold from a second timestamp associated with a capture of the second 3D sub-frame. As used herein, a "timestamp" associated with a capture of a 3D sub-frame may refer to (e.g., may include, be implemented by, etc.) any data, reference signal, or other suitable representation of a point within a temporal sequence (e.g., a precise or approximate moment in real time, a point on a virtual timeline associated with a virtual world, a time of day, a relative time, a universal time, a local time, a satellite reference time, etc.) that is associated with when the 3D sub-frame was captured. In some examples, a timestamp may include data representative of when the capture of the 3D sub-frame was initiated, when the capture was completed, when the 3D sub-frame was received by the volumetric frame capture controller, or another suitable time associated with the capture of the 3D sub-frame.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary volumetric frame capture controller 100 ("controller 100") configured to capture a plurality of 3D sub-frames for use in forming a volumetric frame of a real-world scene. As will be described in more detail below, controller 100 may be associated with various hardware resources, as well as with other volumetric frame capture controllers and associated hardware resources, within a volumetric frame capture system (see FIG. 2).

As shown in FIG. 1, controller 100 may include, without limitation, a 3D sub-frame capture facility 102, a 3D sub-frame processing facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation. Each of facilities 102 through 106 will now be described in more detail.

3D sub-frame capture facility 102 may include one or more physical computing devices (e.g., hardware and/or software components such as processors, memories, communication interfaces, instructions stored in memory for execution by the processors, etc.) that perform various operations associated with obtaining data for a plurality of 3D sub-frames representative of a real-world scene. For example, using the one or more physical computing devices, 3D sub-frame capture facility 102 may transmit a first command to a first 3D capture device disposed at a first fixed position with respect to a real-world scene. The first command may be a command for the first 3D capture device to capture a first 3D sub-frame representative of the real-world scene from a first vantage point associated with the first fixed position. Based on the first command, 3D sub-frame capture facility 102 may receive (e.g., from the first 3D capture device) the first 3D sub-frame. Moreover, 3D sub-frame capture facility 102 may further transmit, to a second 3D capture device disposed at a second fixed position with respect to the real-world scene, a second command to capture a second 3D sub-frame representative of the real-world scene. For instance, the second 3D sub-frame may be representative of the real-world scene from a second vantage point associated with the second fixed position. Based on the second command, 3D sub-frame capture facility 102 may receive the second 3D sub-frame from the second 3D capture device.

In like manner, 3D sub-frame facility 102 may transmit one or more additional commands to one or more additional 3D capture devices to capture one or more additional 3D sub-frames representative of the real-world scene from one or more additional vantage points (e.g., vantage points associated with one or more additional fixed positions at which the one or more additional 3D capture devices are disposed with respect to the real-world scene). Additionally, 3D sub-frame facility 102 may receive, in response to the one or more additional commands, the one or more additional 3D sub-frames from the one or more 3D capture devices. 3D sub-frame facility 102 may further perform other operations related to capturing 3D sub-frames, preparing or arranging to capture 3D sub-frames, receiving, verifying, checking, storing, and/or otherwise processing captured 3D sub-frames, and/or any other suitable operations as may serve a particular implementation.

Once 3D sub-frame capture facility 102 has received a plurality of 3D sub-frames (e.g., including the first and second 3D sub-frames described above), the 3D sub-frames representative of the real-world scene from the disparate vantage points associated with each 3D capture device may be distributed, stored, analyzed, combined, and/or otherwise processed to form volumetric frames representative of the real-world scene from multiple vantage points. In some examples, the volumetric frames may include data that may allow the real-world scene to be recreated from any arbitrary vantage point around or within the real-world scene (e.g., including vantage points associated with fixed positions different from the fixed positions at which the 3D capture devices are disposed).

To this end, 3D sub-frame processing facility 104 may include one or more physical computing components (e.g., hardware and/or software components separate from those of 3D sub-frame capture facility 102 or shared with 3D sub-frame capture facility 102) that perform various operations associated with providing 3D sub-frames captured by 3D sub-frame capture facility 102 (e.g., the first and second 3D sub-frames and/or other 3D sub-frames) for use in forming a volumetric frame of the real-world scene. For example, using the one or more physical computing devices, 3D sub-frame processing facility 104 may determine (e.g., in response to the receipt of the first and second 3D sub-frames by 3D sub-frame capture facility 102) that a first timestamp or reference signal associated with a capture of the first 3D sub-frame is less than a predefined time threshold from a second timestamp associated with a capture of the second 3D sub-frame. In response to the determination that the first timestamp is less than the predefined time threshold from the second timestamp, 3D sub-frame processing facility 104 may provide the first and second 3D sub-frames (e.g., to another facility of controller 100, to another system downstream from controller 100 in a processing pipeline, to a media player device used by an end user, etc.) for use in forming a volumetric frame of the real-world scene. For example, by providing the 3D sub-frames, 3D sub-frame processing facility 104 (or the other facility, system, or device to which the 3D sub-frames are provided) may align the first and second 3D sub-frames based on one or more predetermined alignment parameters to form the volumetric frame of the real-world scene.

As described above, a volumetric frame may be formed from a plurality of 3D sub-frames. In order to keep certain examples described herein as straightforward as possible for purposes of clarity, two 3D sub-frames (i.e., the first and the second 3D sub-frames) are described in various examples as being analyzed (e.g., determining whether the respective timestamps of the 3D sub-frames are within the predefined time threshold from one another), aligned, and/or otherwise processed to form a volumetric frame. However, while it may be possible to generate certain types of volumetric frames with only two 3D sub-frames, it will be understood that certain benefits may result from providing a plurality of 3D sub-frames with more than two 3D sub-frames for use in forming a volumetric frame. For instance, by providing a plurality of 3D sub-frames with several more 3D sub-frames (e.g., three, six, eight, or twelve 3D sub-frames, for instance), a volumetric frame may be formed that better represents the entire real-world scene from vantage points surrounding the real-world scene on all sides (at least along two dimensions). Examples of real-world scenes surrounded by several (i.e., more than two) 3D capture devices along at least two dimensions, as well as volumetric frames formed from 3D sub-frames associated with each of the 3D capture devices surrounding the real-world scene, will be described in more detail below.

Storage facility 106 may maintain any suitable data received, generated, managed, maintained, used, and/or transmitted by facilities 102 or 104 in a particular implementation. For example, as shown, storage facility 106 may include management data 108, which may include data associated with instructions (e.g., programming) for performing the operations described herein and/or any other data as may facilitate facilities 102 and 104 in performing the operations described herein. Similarly, storage facility 106 may include 3D content data 110, which may include data (e.g., image data, video data, depth data, audio data, metadata, etc.) associated with 3D sub-frames, volumetric frames, volumetric data streams representative of volumetric models of the real-world scene (e.g., based on the volumetric frames), and/or any other type of 3D content as may serve a particular implementation. Storage facility 106 may also maintain additional or alternative data as may serve a particular implementation.

In certain examples, controller 100 may perform one or more of the operations described herein in real time as events occur within the real-world scene. For example, if the real-world scene is associated with a real-world event (e.g., a sporting event or the like), it may be desirable for the users who are not attending the real-world event to experience the real-world event live (e.g., in real time as the real-world event is occurring with as small a delay as possible). Accordingly, for instance, the transmitting of the first and second commands, the receiving of the first and second 3D sub-frames, the determining that the first timestamp is less than the predefined time threshold from the second timestamp, and the providing of the first and second 3D sub-frames for use in forming the volumetric frame of the real-world scene may each be performed in real time as events occur within the real-world scene. Additionally or alternatively, one or more of the operations described herein may be performed in a time-shifted manner (e.g., in order to provide the captured data sometime after the 3D sub-frames are captured).

While data capture, processing, and distribution may take a finite amount of time such that it is impossible for data to be captured, processed, and distributed to end users precisely as events within a real-world scene occur, as used herein, an operation is considered to be performed "in real time" when the operation is performed immediately and without undue delay. Accordingly, a user may be said to experience a real-world scene in real time even if the user experiences particular events within the real-world scene (e.g., a particular shot in a basketball game) a few seconds or minutes after the events actually take place at the real-world scene.

As mentioned above, one benefit of the methods and systems for generating volumetric frames of real-world scenes based on pluralities of 3D sub-frames described herein is that both the computing resources and the operations that the computing resources are used to perform may be highly scalable to meet various system requirements. In other words, for systems that require minimal processing, a basic implementation of controller 100 with appropriate computing resources to meet the minimal processing requirements may suffice. For example, a basic implementation may be one that is configured to control a relatively small number of 3D capture devices (e.g., disposed in relation to a relatively small real-world scene) that each capture data with relatively low fidelity (i.e., relatively low resolution, picture quality, etc.) to thereby form volumetric frames with relatively small amounts of data.

At the same time, volumetric frame capture systems capable of meeting much more significant processing requirements may also be implemented using the system infrastructures described herein, even if such advanced systems may be proportionally more costly to create due to additional hardware they may require. For instance, a more advanced system may be required to control a relatively large number of 3D capture devices (e.g., disposed in relation to a relatively large real-world scene) that each capture data with relatively high fidelity (i.e., relatively high resolution, picture quality, audio quality, etc.) to thereby form volumetric frames with relatively large amounts of data. To implement such advanced systems, a plurality of volumetric frame capture controllers (e.g., such as controller 100) may be combined with associated hardware resources in a volumetric frame capture system of arbitrary size and cost to meet the more significant processing requirements.

Figure 2:
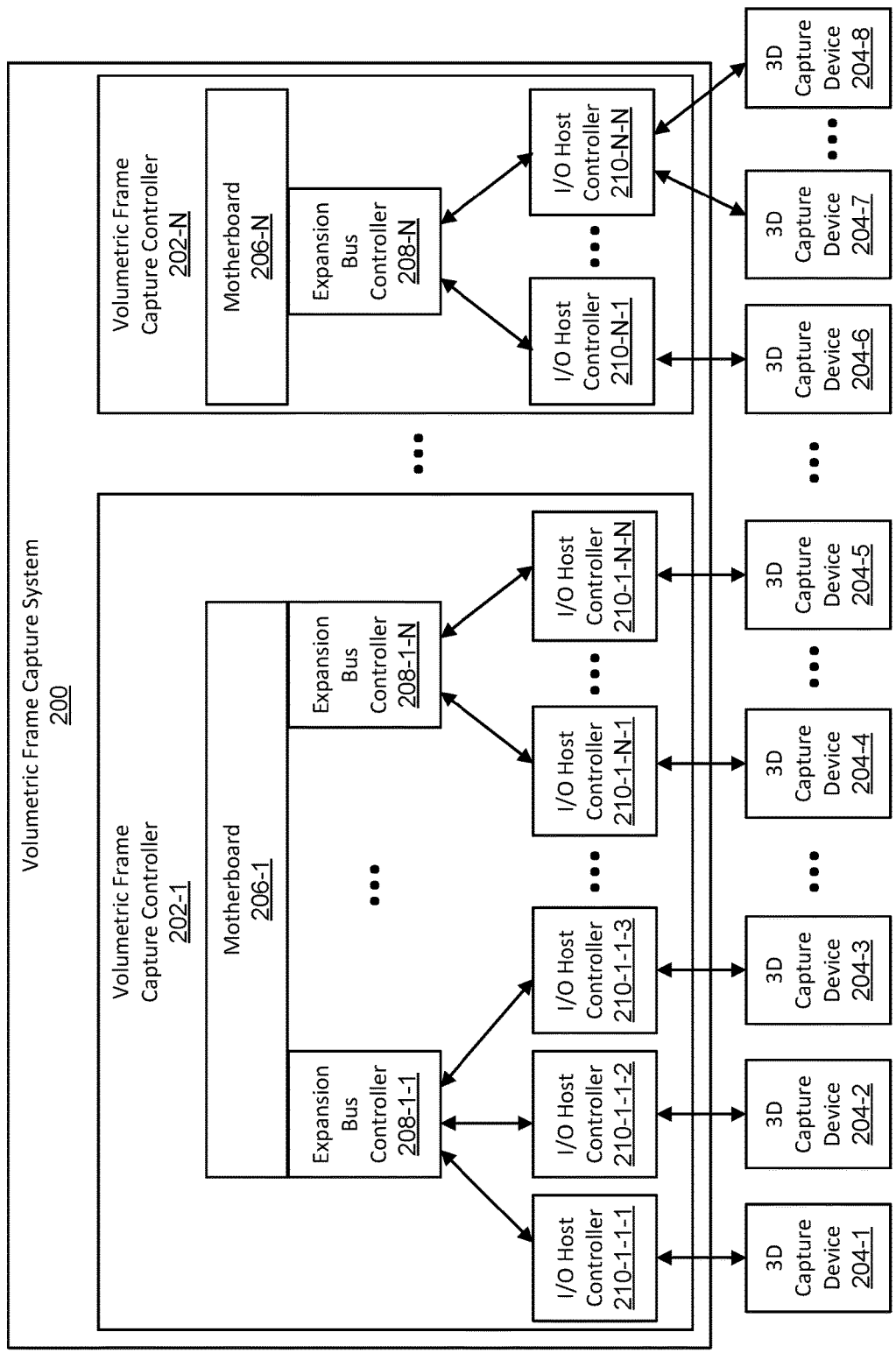
FIG. 2 illustrates an exemplary volumetric frame capture system that includes a plurality of exemplary volumetric frame capture controllers for capturing a plurality of 3D sub-frames for use in forming a volumetric frame of a real-world scene according to principles described herein.

To illustrate, FIG. 2 shows an exemplary volumetric frame capture system 200 ("system 200") that includes a plurality of exemplary implementations of volumetric frame capture controllers 202 (e.g., volumetric frame capture controllers 202-1 through 202-N, where N represents any arbitrary number of volumetric frame capture controllers) for generating volumetric frames of real-world scenes based on pluralities of 3D sub-frames. Each of volumetric frame capture controllers 202 ("controllers 202") may be an implementation of controller 100, described above in relation to FIG. 1.

As shown, controllers 202 may be communicatively coupled with a plurality of 3D capture devices 204 (e.g., 3D capture devices 204-1 through 204-8, as well as other 3D capture devices not explicitly shown but represented with ellipsis in FIG. 2). It will be understood that 3D capture devices 204 may be disposed at a plurality of fixed positions with respect to a real-world scene (not explicitly shown in FIG. 2). As further illustrated in FIG. 2, each controller 202 may include at least one motherboard 206 (e.g., motherboard 206-1 in controller 202-1 and motherboard 206-N in controller 202-N), one or more expansion bus controllers 208 (e.g., expansion bus controllers 208-1-1 and 208-1-N in controller 202-1, expansion bus controller 208-N in controller 202-N, and additional expansion bus controllers not explicitly shown but represented by ellipsis), and one or more input/output (I/O) host controllers 210 (e.g., I/O host controllers 210-1-1-1, 210-1-1-2, 210-1-1-3, 210-1-N-1, and 210-1-N-N in controller 202-1, I/O host controllers 210-N-1 and 210-N-N in controller 202-N, and additional I/O host controllers not explicitly shown but represented by ellipsis).

In system 200, as shown, each of expansion bus controllers 208 included within each of controllers 202 may be associated with different I/O host controllers 210. In other words, each expansion bus controller 208 may support one or more I/O host controllers 210 (e.g., expansion bus controller 208-1-1 supports I/O host controllers 210-1-1-1, 210-1-1-2, and 210-1-1-3, etc.), but two expansion bus controllers 208 may not be associated with the same I/O host controller 210. In like manner, each of I/O host controllers 210 may be associated with different 3D capture devices 204. In other words, each I/O host controller 210 may support one or more 3D capture devices 204 (e.g., I/O host controller 210-1-1-1 supports 3D capture device 204-1, I/O host controller 210-N-N supports both 3D capture devices 204-7 and 204-8, etc.), but two I/O host controllers 210 may not be associated with the same 3D capture device 204.

As described above in relation to FIG. 1, each controller 202 may further include at least one physical computing device that performs (e.g., in conjunction with other hardware devices shown in FIG. 2) the operations described above. In some examples, one controller 202 may be designated as a chief controller to coordinate operations performed by all of the controllers 202.

System 200, including controllers 202 and each of the hardware components included therein, may be implemented by any computing components and devices as may serve a particular implementation. For instance, in some examples, multiple controllers 202 may be implemented within a single computer (e.g., on a single printed circuit board such as a single card, a single motherboard, etc.) or on closely associated computers (e.g., different blades within a blade server or the like). In other examples, controllers 202 may each be implemented as a separate computer (e.g., associated with a separate motherboard). In any case, each of controllers 202 may be implemented using any suitable type of computer such as a server computer, a personal computer (e.g., a desktop or laptop computer), a video game console, a mobile computing device (e.g., a smartphone or tablet computing device, etc.), an all-in-one card, a custom capture system (e.g., including one or more application specific integrated circuits ("ASICs"), field programmable gate arrays ("FPGAs"), or other customizable hardware equipment), or any other suitable type of computer. In some implementations, each separate computer implementing controllers 202 within system 200 may be communicatively coupled with the other separate computers by way of a network or other suitable connection (not explicitly shown in FIG. 2). For instance, the network may be a wireless network (e.g., a Wi-Fi network) or a wired network and may use any network technology described herein or as may serve a particular implementation.

In certain examples, each expansion bus controller 208 included within the separate computers of controllers 202 may be implemented as a separate Peripheral Component Interconnect Express ("PCIe") controller card plugged into the respective motherboard of the respective computer with which the PCIe controller card is associated. Moreover, as another example, each I/O host controller 210 may be implemented as a separate Universal Serial Bus ("USB") host controller plugged into the respective PCIe controller card (i.e., the respective expansion bus controller 208) with which the USB host controller is associated. For instance, I/O host controller 210-1-1-1 may be a USB host controller plugged into (i.e. communicating with) expansion bus controller 208-1-1, which may be a PCIe controller card plugged into motherboard 206-1, which may be the motherboard of a server computer or the like. In other examples, other types of expansion bus controllers and/or I/O host controllers (i.e., other than PCIe and/or USB) may be employed as may serve a particular implementation.

3D capture devices 204 may also be implemented using any suitable hardware and/or with any capabilities as may serve a particular implementation. For example, each of 3D capture devices 204 (i.e., including the first and second 3D capture devices described above) may include at least one two-dimensional ("2D") video capture device configured to capture 2D video data representative of the real-world scene, and at least one depth capture device configured to capture depth data representative of the real-world scene. The 2D video capture device may include a video camera or other such device capable of capturing video data and/or still images (i.e., video data frames) based on light frequencies. The depth capture device may include one or more components configured to generate a depth map of various objects within the real-world scene (i.e., a representation of the 3D position of various points on the surfaces of the objects as viewed from a particular vantage point) by way of one or more depth map capture techniques, as will be described in more detail below.

Accordingly, each 3D sub-frame captured by one of 3D capture devices 204 may include a frame of 2D video data representative of the real-world scene from a particular vantage point (e.g., a still image depicting the real-world scene from the vantage point associated with the 3D capture device that captured the 3D sub-frame), a frame of depth data representative of the real-world scene from the particular vantage point, and/or any other data (e.g., metadata, audio data, etc.) associated with the real-world scene, the particular vantage point, etc., as may serve a particular implementation. Specifically, for example, the first 3D sub-frame may include a first frame of 2D video data and depth data representative of the real-world scene from the first vantage point, while the second 3D sub-frame may include a second frame of 2D video data and depth data representative of the real-world scene from the second vantage point. Additional examples of 3D capture devices and the 3D sub-frames they capture will be described and illustrated below.

As described above and as shown in FIG. 2, system 200 may be highly configurable and scalable to meet various capture system requirements or design goals. For example, a relatively basic implementation of system 200 may include just one volumetric frame capture controller 202 having one motherboard 206, one or two expansion bus controllers 208, and a relatively small number (e.g., six to eight) I/O host controllers 210 each configured to couple with a respective 3D capture device 204. At the same time, a much more sophisticated implementation of system 200 may also be created using the same principles and hardware components shown in FIG. 2. Specifically, for example, a more advanced implementation of system 200 may include many networked controllers 202, each with several expansion bus controllers 208 that are each associated with several I/O host controllers 210.

In some examples (e.g., as illustrated by I/O host controller 210-N-N in FIG. 2), a plurality of 3D capture devices 204 may be associated with a single I/O host controller 210. For example, if system requirements are such that the I/O host controller can serve each of the plurality of 3D capture devices 204 while meeting the system requirements (e.g., frames processed per second, latency requirements, etc.), it may save resources (e.g., power, cost, etc.) for the unitary I/O host controller to service the plurality of 3D capture devices 204. In some examples, however, achieving a desired performance (e.g., associated with more expansive system requirements or the like) may best be accomplished by assigning a distinct, dedicated I/O host controller 210 to each and every 3D capture device 204 associated with system 200. For example, by not having to share the I/O host controller 210 with other 3D capture devices 204, a 3D capture device 204 may avoid much of the overhead normally associated with using a shared I/O host controller (e.g., requesting file descriptors from and returning the file descriptors to the operating system, etc.). This may allow the 3D capture devices to be much more efficient and responsive to commands sent by controllers 202, and to transmit 3D sub-frames back to controllers 202 with significantly less latency, and forth.

Figure 3:
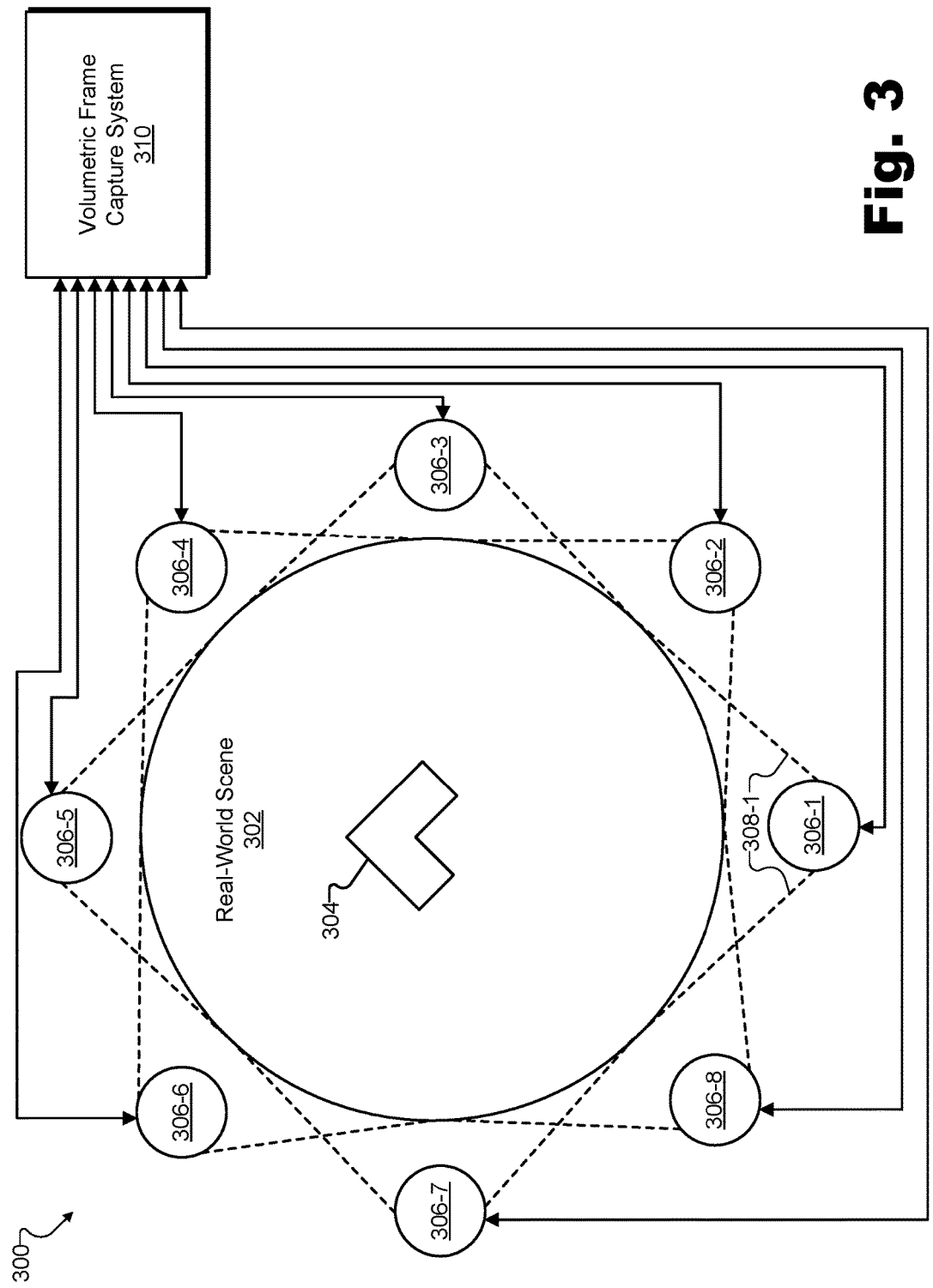
FIG. 3 illustrates an exemplary configuration in which an exemplary volumetric frame capture system generates a volumetric frame of a real-world scene based on a plurality of 3D sub-frames captured by a plurality of 3D capture devices according to principles described herein.

FIG. 3 illustrates an exemplary configuration 300 in which an exemplary volumetric frame capture system generates a volumetric frame of a real-world scene based on a plurality of 3D sub-frames captured by a plurality of 3D capture devices. More specifically, as shown in FIG. 3, configuration 300 includes a real-world scene 302 that includes an object 304 and is surrounded by a plurality of fixed positions 306 (i.e., positions 306-1 through 306-8) each associated with a respective vantage point 308 (e.g., vantage point 308-1 of position 306-1 and other similar vantage points of other positions 306 shown but not explicitly labeled in configuration 300). 3D capture devices disposed at each of positions 306 may be communicatively coupled with a volumetric frame capture system 310, which may issue commands to the 3D capture devices, receive 3D sub-frames from the 3D capture devices, and verify, analyze, combine, align, and/or otherwise process the 3D sub-frames (e.g., to form volumetric frames as described herein). Each of the elements of configuration 300 will now be described in detail.

Real-world scene 302 may represent any real-world scenery, real-world location, real-world event (e.g., live event, etc.), or other subject existing in the real world (e.g., as opposed to existing only in a virtual world or an imaginary world) as may serve a particular implementation. As illustrated by the circle representing real-world scene 302 in FIG. 3, real-world scene 302 may be a specifically delineated area such as a stage, an arena, or the like. Conversely, in other examples, real-world scene 302 may not be so well defined or delineated. For example, real-world scene 302 may include any indoor or outdoor real-world location such as a city street, a museum, a scenic landscape, or the like. In certain examples, real-world scene 302 may be associated with a real-world event such as a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event. In the same or other examples, real-world scene 302 may be associated with a setting for a fictionalized scene (e.g., a set of a live-action virtual reality television show or movie) and/or any other scene at any other indoor or outdoor real-world location as may serve a particular implementation.

Accordingly, object 304 may represent any real-world object, whether living or inanimate, that is associated with real-world scene 302 (e.g., located within or around real-world scene 302) and that is detectable (e.g., viewable, etc.)

from at least one of vantage points 308. For example, while object 304 is drawn as a relatively simple geometric shape for the sake of clarity, it will be understood that object 304 may represent various types of objects having various levels of complexity. Rather than a geometric shape, for instance, object 304 could represent any animate or inanimate object or surface, such as a person or another living thing, a non-transparent solid, liquid, or gas, a less discrete object such as a wall, a ceiling, a floor, or any other type of object described herein or as may serve a particular implementation.

As shown, object 304 may include various surfaces that may each reflect light (e.g., ambient light in real-world scene 302, infrared light in a structured light pattern emitted by a depth capture device, etc.) to be detected by 3D capture devices disposed at fixed positions 306 as part of the capture by each 3D capture device of a 3D sub-frame representative of real-world scene 302. While object 304 is depicted to be relatively simple, the depth of the surfaces of object 304 may appear different based on which position 306 and vantage point 308 the surfaces are detected from, as will be illustrated below. In other words, object 304 may look different based on a perspective (e.g., position, vantage point, etc.) from which object 304 is viewed. Accordingly, to volumetrically model object 304 (e.g., within a volumetric frame), data representative of object 304 from various vantage points 308 surrounding object 304 may be used.

Fixed positions 306 may each be associated with one or more 3D capture devices (e.g., one 3D capture device fixed on a tripod, a plurality of 3D capture devices stacked at different heights on a single tripod, etc.). While positions 306 may be fixed with respect to real-world scene 302, real-world scene 302 and the relative positions 306 with respect to real-world scene 302 may be in motion together. The first and second fixed positions described above may be included within positions 306 and may refer to two arbitrary positions 306 (e.g., neighboring positions such as positions 306-1 and 306-2, positions across from one another such as positions 306-1 and 306-5, etc.). As noted above, while certain examples are described herein with reference to two 3D sub-frames from two positions, in many implementations, volumetric frame capture controllers (e.g., controller 100) may be configured to request, receive, and process more than two 3D sub-frames from two positions. For example, the first and second fixed positions referred to in certain examples herein may be included within a plurality of fixed positions with respect to real-world scene 302 (e.g., positions 306), which, as shown, may surround real-world scene 302 along at least two dimensions associated with real-world scene 302. For instance, positions 306 are shown to surround real-world scene 302 along two dimensions associated with real-world scene 302 (along a plane such as the ground), while, in certain examples, positions 306 could further surround real-world scene 302 along three dimensions (e.g., by including positions 306 above and below 302 as well).

Vantage points 308 may be illustrated with respect to each position 306 with dotted lines emanating from the position 306. For example, as labeled in FIG. 3, the lines emanating from position 306-1 may represent vantage point 308-1. The first and second vantage points associated with the first and second fixed positions described herein may be included in vantage points 308 associated with the positions 306 surrounding real-world scene 302 along at least two dimensions. In some examples, as shown in configuration 300, vantage points 308 may each be angled inwardly toward real-world scene 302 so as to capture real-world scene 302 from enough perspectives to generate a volumetric model of real-world scene 302. Additionally, in the same or other examples, one or more of vantage points 308 may be angled outwardly (i.e., away from real-world scene 302) to capture objects surrounding real-world scene 302 or the like. For instance, a 360-degree capture device with a spherical, outward facing vantage point may be placed at a position in the middle of real-world scene 302 (not explicitly shown) to capture objects included within real-world scene 302 from additional perspectives and/or to capture devices outside of real-world scene 302. Additionally or alternatively, in certain examples, a plurality of outward facing vantage points may allow a volumetric frame capture system to capture 3D sub-frames representing a panoramic, wide angle, or 360-degree view of a real-world scene.

Various arrows in configuration 300 represent communications between 3D capture devices at each of positions 306 and volumetric frame capture system 310. These communications may be implemented using a wired protocol (e.g., USB), a wireless protocol (e.g., Wi-Fi), or any other communication protocol as may serve a particular implementation. Volumetric frame capture system 310 may be implemented as any suitable implementation of system 200 as described above. For example, volumetric frame capture system 310 may be implemented with a single volumetric frame capture controller (e.g., such as controller 100), one or two expansion bus controllers (e.g., PCIe controller cards), and eight I/O host controllers (e.g., a USB host controller associated with each 3D capture device at each position 306). However, if configuration 300 were to include more 3D capture devices (e.g., to cover a larger real-world scene 302, to capture real-world scene 302 with more detail by stacking multiple 3D capture devices at each position 306, etc.), 3D capture devices with relatively high fidelity (i.e., that capture lots of detail and generate large amounts of data), or the like, volumetric frame capture system 310 may be implemented with multiple volumetric frame capture controllers each with however many expansion bus controllers, I/O host controllers, and/or other hardware resources as may serve that particular configuration.

In operation, volumetric frame capture system 310 may perform various operations as described above. For example, volumetric frame capture system 310 may transmit first and second commands to first and second 3D capture devices at different positions 306, receive first and second 3D sub-frames from the first and second 3D capture devices, determine that first and second timestamps associated with the capture of the first and second 3D sub-frames are within a predefined time threshold from one another, and provide the first and second 3D sub-frames for use in forming a volumetric frame of real-world scene 302.

In some examples, volumetric frame capture system 310 may wait, after transmitting a command to a 3D capture device to capture a 3D sub-frame, to receive the 3D sub-frame from the 3D capture device prior to transmitting another command to another 3D capture device. In other words, for instance, referring to the example above, volumetric frame capture system 310 may transmit the first command to the first 3D capture device, receive the first 3D sub-frame, and then transmit the second command in response to receiving the first 3D sub-frame. Volumetric frame capture system 310 may systematically gather 3D sub-frames from 3D capture devices at each of the positions 306 in a round robin fashion starting at position 306-1, for example, such that by the time a 3D sub-frame is received from the 3D capture device at position 306-8, volumetric frame capture system 310 may have 3D sub-frames representative of real-world scene 302 from all of vantage points 308 within a relatively small range of time (i.e., however long it takes to request and receive all eight 3D sub-frames).

In other examples, volumetric frame capture system 310 may transmit multiple commands to multiple 3D capture devices to capture the 3D sub-frames without waiting. In other words, for instance, referring to the example above, volumetric frame capture system 310 may transmit the first command to the first 3D capture device and then transmit the second command to the second 3D capture device in response to transmitting the first command (i.e., without waiting to receive the first 3D sub-frame). If the 3D capture devices have significant latency in performing the capture of real-world scene 302, this may allow all of the 3D sub-frames to still be captured within a relatively small range of time. However, volumetric frame capture system 310 may wait to receive 3D sub-frames from each of the 3D capture devices from which a 3D sub-frame has been requested (i.e., all of the 3D sub-frames that are to be aligned to form the volumetric frame) before transmitting an additional command to any 3D capture device to capture another 3D sub-frame (e.g., for the next volumetric frame).

Thus, after a volumetric frame capture controller has received all requested 3D sub-frames for a volumetric frame, the volumetric frame capture controller may transmit one or more additional commands to capture one or more additional 3D sub-frames representative of real-world scene 302 from the first and second vantage points 308 to the first and second 3D capture devices, receive the one or more additional 3D sub-frames from the first and second 3D capture devices based on the one or more additional commands, and provide the one or more additional 3D sub-frames for use in forming an additional volumetric frame of real-world scene 302 (e.g., a volumetric frame distinct from and subsequent to the initial volumetric frame in a sequence of volumetric frames). However, volumetric frame capture system 310 may ensure that the receiving of the first and second 3D sub-frames (e.g., as well as the determining of the timestamps and/or the providing of the 3D sub-frames in certain examples) is completed prior to the transmitting of the one or more additional commands to capture the one or more additional 3D sub-frames.

In this way, each set of 3D sub-frames that is to be combined to form one volumetric frame may be segregated from 3D sub-frames that are to become part of different volumetric frames. As such, overhead operations such as organizing, sorting, ordering, synchronizing, or other processing may be avoided. As described above, avoiding such overhead processing may provide significant processing advantages as compared with a capture system in which 3D sub-frames are pushed to the capture system by 3D capture devices and need to be organized, sorted, synchronized to match in time, and the like.

Figure 4A:
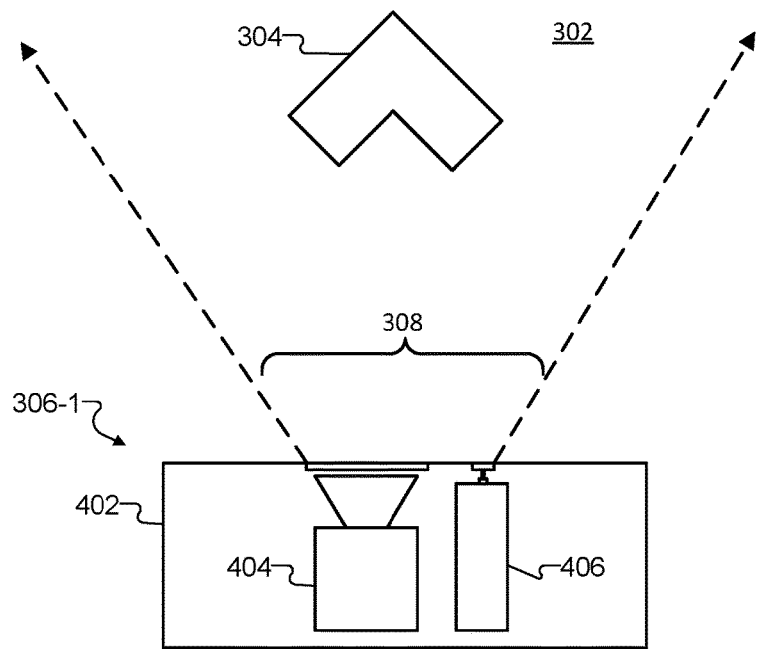
FIG. 4A illustrates an exemplary 3D capture device capturing a 3D sub-frame according to principles described herein.
Figure 4B:
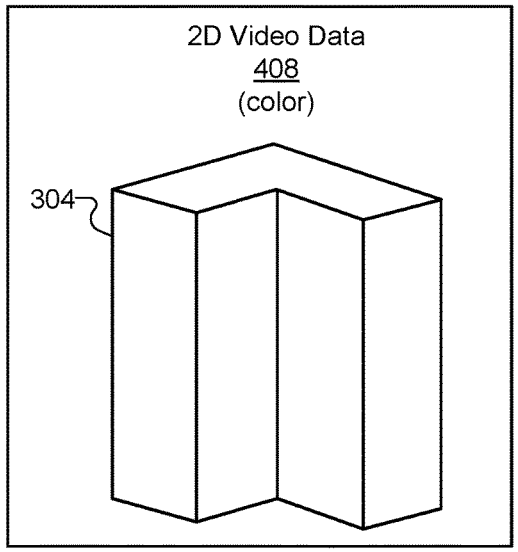
FIGS. 4B-4C illustrate exemplary graphical depictions of data representative of the 3D sub-frame captured by the 3D capture device of FIG. 4A according to principles described herein.
Figure 4C:
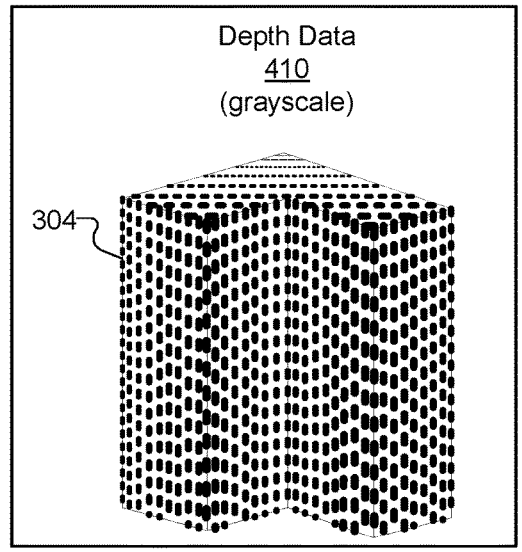

To illustrate how the 3D capture devices at each position 306 in configuration 300 capture 3D sub-frames representative of real-world scene 302, FIG. 4A illustrates an exemplary 3D capture device 402 capturing a 3D sub-frame graphically depicted in FIGS. 4B and 4C. As shown, 3D capture device 402 may be disposed at position 306-1 with respect to object 304 in real-world scene 302 (as shown above in FIG. 3). 3D capture device 402 may be an implementation of one of 3D capture devices 204, described above in relation to FIG. 2. As such, 3D capture device 402 may include a 2D video capture device 404 configured to capture 2D video data representative of real-world scene 302 (e.g., including 2D video data of object 304), and a depth capture device 406 configured to capture depth data representative of real-world scene 302 (e.g., including depth data representative of object 304).

2D video capture device 404 may be implemented by any suitable 2D video capture device (e.g., a video camera or the like) and may capture 2D video data in any manner as may serve a particular implementation. In some examples, 2D video capture device 404 may be a separate device from depth capture device 406. Collectively, such separate devices (e.g., as well as any communication interfaces and/or other hardware or software mechanisms used to functionally merge the devices) may be referred to as a 3D capture device (e.g., 3D capture device 402). In other examples, as shown in FIG. 4A, 2D video capture device 404 and depth capture device 406 may be integrated into a single device (i.e., 3D capture device 402) that captures both 2D video data and depth data as will be described.

Whether implemented as a separate device or integrated with 2D video capture device 404, depth data capture device 406 may capture depth data representative of real-world scene 302 in any manner as may serve a particular implementation. For instance, depth data capture device 406 may employ one or more depth map capture techniques such as a structured light depth map capture technique, a stereoscopic depth map capture technique, a time-of flight depth map capture technique, and/or any other depth map capture technique as may serve a particular implementation. A few depth map capture techniques that may be employed by depth data capture device 406 will now be briefly described.

A structured light depth map capture technique may be used to capture depth data (e.g., a depth map) representative of real-world scene 302 based on a detected structured light pattern projected from a position offset from where the structured light pattern is detected. For example, due to the shape of object 304, a structured light pattern emitted by a structured light emitter included within 3D capture device 402 may follow a curvature of the surfaces of object 304 and may appear, from a position of a structured light sensor, to bend and contour to the surfaces of object 304. 3D capture device 402 may thus determine depth data representative of the surfaces of object 304 by triangulating particular physical points on surfaces of object 304 based on known angles and fixed positions of both the structured light emitter and the structured light sensor, and based on how particular light associated with the structured light pattern reflects from the particular physical points on the surfaces of object 304.

A stereoscopic depth map capture technique may be used to capture depth data representative of real-world scene 302 based on stereoscopic differences in how the surfaces of the objects are detected from first and second fixed positions of first and second video capture devices disposed at different positions. To implement a stereoscopic depth map capture technique in some examples, 3D capture device 402 may include two 2D video capture devices 404 slightly offset from one another. For instance, depth capture device 406 shown in 3D capture device 402 may be implemented by a second 2D video capture device similar (but slightly offset from) 2D video capture device 404. In other examples, 2D video capture device 404 may be used in conjunction with one or more additional 2D video capture devices included in one or more separate 3D capture devices at separate positions 306 (e.g., position 306-2). Based on stereoscopic differences in how particular physical points on surfaces of object 304 appear from the first fixed position and how the particular physical points appear from the second fixed position, one or more 3D capture devices (e.g., including 3D capture device 402) may triangulate the particular physical points in space based on known angles and fixed positions of both video capture devices to determine depth data for the particular physical points.

A time-of-flight depth map capture technique may be used to capture depth data representative of real-world scene 302 based on different amounts of time that it takes for light pulses to travel round trip from depth capture device 406 to reflect from points on the surface of object 304 and return back to depth capture device 406. For example, a light pulse configured to bathe real-world scene 302 in light (i.e., to reflect off all the surfaces of the objects visible from vantage point 308-1 of 3D capture device 402 like a camera flash) may be emitted at a particular time that represents a singular moment in time or a relatively short period of time. Because light from the emitted light pulse travels from depth capture device 406 to the surfaces of the objects within real-world scene 302 (e.g., the surfaces of object 304) and then, after being reflected from the surfaces, travels back to be detected at 3D capture device 402 with a constant and predictable speed (i.e., the speed of light), different arrival times of light reflecting from different physical points on the surfaces of object 304 may indicate the respective depths of the different physical points on the surfaces. Accordingly, by tracking and correlating precise arrival times of light reflecting back from the surfaces object 304, depth capture device 406 may determine the depth data representative of the surfaces of object 304.

One or more of the depth map capture techniques described above, as well as other depth map capture techniques may be used to capture depth data in various examples. As such, 3D capture device 402 may include any suitable devices (e.g., one or more 2D video capture devices 404, light emitters and/or detectors associated with different types of depth capture devices 406, etc.) as may serve a particular implementation. Additionally, in some examples, depth data captured using two different (e.g., complementary) depth map capture techniques may be merged to generate the most accurate depth data possible.

Regardless of the type and number of depth map capture techniques used to capture depth data, each 3D sub-frame generated by 3D capture device 402 at position 306-1 may include a frame of 2D video data and depth data representative of real-world scene 302 from vantage point 308-1. Likewise, other 3D sub-frames captured by other 3D capture devices disposed at other positions 306 may similarly include a frame of 2D video data and depth data representative of real-world scene 302 from other respective vantage points 308 provided by the other positions 306 of the other 3D capture devices.

To illustrate, FIGS. 4B and 4C illustrate exemplary graphical depictions of data representative of the 3D sub-frame captured by 3D capture device 402. Specifically, as shown, the 3D sub-frame may include at least two distinct datasets: 2D video data 408 (shown in FIG. 4B) and depth data 410 (shown in FIG. 4C).

In FIG. 4B, 2D video data 408 depicts object 304 within real-world scene 302 as viewed from the perspective of vantage point 308 by 2D video capture device 404 within 3D capture device 402. Because 2D video data 408 may represent a single video frame in a sequence of video frames, the depiction of object 304 represented by 2D video data 408 may represent how object 304 (e.g., as well as other objects associated with real-world scene 302) appeared from vantage point 308 at a single moment in time. While illustrated as an image in FIG. 4B, it will be understood that 2D video data 408 may be captured, encoded, formatted, transmitted, and represented in any suitable form. For example, 2D video data 408 may be digital data that is formatted according to a standard video encoding protocol, a standard image format, or the like. As indicated in FIG. 4B, 2D video data 408 may represent a color image (e.g., similar to a color photograph) of the objects in real-world scene 302. Additionally or alternatively, 2D video data may be a grayscale image representative of the objects (e.g., similar to a black and white photograph).

In FIG. 4C, depth data 410 also (like 2D video data 408) depicts object 304 within real-world scene 302 from the perspective of vantage point 308. However, rather than representing the visible appearance of object 304 (i.e., representing in color or grayscale how light interacts with the surfaces of object 304), depth data 410 may represent the depth (i.e., the distance or position) of each point on the surface of object 304 (e.g., as well as other objects within real-world scene 302) relative to, for example, depth capture device 406 in 3D capture device 402. As with 2D video data 408, depth data 410 may be captured, encoded, formatted, transmitted, and represented in any suitable form. For example, as shown, depth data 410 may be represented by grayscale image data (e.g., six or eight bits for each pixel captured by depth capture device 406). However, rather than representing how light reflects from the surfaces of object 304 (i.e., as represented in 2D video data 408), the grayscale image of depth data 410 may represent, for each pixel in the image, how far away the point represented by that pixel is from depth capture device 406. For example, points that are closer to depth capture device 406 may be represented with values that represent darker shades of gray (e.g., binary values closer to 0b111111 in the case of a six-bit implementation where 0b111111 represents black). Conversely, points that are farther away from depth capture device 406 may be represented with values that represent lighter shades of gray (e.g., binary values closer to 0b000000 in the case of the six-bit implementation where 0b000000 represents white).

FIG. 5 illustrates exemplary graphical depictions of data representative of the plurality of 3D sub-frames of real-world scene 302 captured by 3D capture devices disposed at fixed positions 306 surrounding real-world scene 302 (see FIG. 3). Specifically, a plurality of 3D sub-frames 502 (i.e., 3D sub-frames 502-1 through 502-8) depict real-world scene 302 (e.g., including object 304) from each of the vantage points 308 associated with positions 306. For example, as shown, 3D sub-frame 502-1 represents a 3D sub-frame captured by a 3D capture device disposed at position 306-1 with vantage point 308-1 (i.e., 3D capture device 402 illustrated above in FIG. 4), 3D sub-frame 502-2 represents a 3D sub-frame captured by a 3D capture device disposed at position 306-2 with vantage point 308-2, and so forth up to 3D sub-frame 502-8, which represents a 3D sub-frame captured by a 3D capture device disposed at position 306-8 with vantage point 308-8. It will be understood that, while each of 3D sub-frames 502 are shown to depict an image similar to the image depicted for 2D video data 408 in FIG. 4B, each 3D sub-frame 502 illustrated in FIG. 5 may represent not only 2D video data, but also depth data (e.g., similar to depth data 410), audio data, metadata, and/or any other data as may be captured by the respective 3D capture device in a particular implementation.

As further shown in FIG. 5, each 3D sub-frame 502 may include (e.g., within metadata of the 3D sub-frame or the like) a respective timestamp 504 (i.e., timestamp 504-1 associated with 3D sub-frame 502-1, timestamp 504-2 associated with 3D sub-frame 504-2, etc., up to timestamp 504-8, which is associated with 3D sub-frame 504-8). Each timestamp 504 may be associated with a capture of the respective 3D sub-frame 502 within which the timestamp is included. For example, timestamp 504-1 may represent a precise moment in time that 3D capture device 402 captured 3D sub-frame 502-1. As such, timestamps 504 may be captured, encoded, formatted, transmitted, and/or represented in any suitable form. For instance, as shown in FIG. 5, timestamps 504 may each represent a number of elapsed milliseconds ("ms") since a particular capture session began (i.e., which may have occurred several minutes before 3D sub-frames 502 were captured). In other examples, as described above, timestamps 504 may represent any other type of reference signal and/or may represent a point in any type of temporal sequence (e.g., time of day, real time, relative time, virtual time, etc.). Additionally, it will be understood that timestamps may be associated with any suitable units. For instance, rather than milliseconds, a timestamp may reflect microseconds or another unit of time, or may be unitless.

As shown, in certain examples, timestamps 504 may be in ascending order (i.e., steadily incrementing from timestamp 504-1 at 05432100 up to timestamp 504-8 at 05432131). This may be the case, for example, in an implementation where the volumetric frame capture controller (e.g., controller 100) only transmits a command to capture a next 3D sub-frame after a last requested 3D sub-frame has been received. Accordingly, in these examples, controller 100 may be configured to always treat timestamp 504-1 as the earliest timestamp 504 and timestamp 504-8 as the latest timestamp 504 without having to perform additional processing.

As described above, however, in other implementations, controller 100 may transmit multiple commands (e.g., to all of the 3D capture devices) and then wait to receive the 3D sub-frames for a particular volumetric frame before beginning to transmit commands requesting 3D sub-frames for the next volumetric frame. In these types of implementations, timestamps 504 may be out of order with one another (e.g., timestamp 504-2 may be earlier than timestamp 504-1, for example), although it is noted that all timestamps 504 will still occur prior to timestamps associated with capture of the next volumetric frame. In these or other examples, a minimum amount of timestamp processing may be performed (e.g., to determine an earliest timestamp 504 and a latest timestamp 504).

As described above, controller 100 may determine (e.g., in response to receiving the 3D sub-frames) that a first timestamp associated with a capture of a first 3D sub-frame is less than a predefined time threshold from a second timestamp associated with a capture of the second 3D sub-frame. In some examples, the first timestamp may refer to an earliest timestamp 504 (i.e., timestamp 504-1 in the example of FIG. 5) while the second timestamp may refer to a latest timestamp 504 (i.e., timestamp 504-8 in the example of FIG. 5). In this way, by determining that the earliest timestamp is less than the predefined time threshold from the latest timestamp, controller 100 may guarantee that all of timestamps 504 may be within the predefined time threshold from one another.

The determination that all the timestamps 504 are within the predefined time threshold may act as a check to ensure that all of 3D sub-frames 502 may be treated as being synchronized or, in other words, as having been captured simultaneously. Of course, as indicated by timestamps 504, 3D sub-frames 502 are not actually captured at precisely the same moment but are captured within a few microseconds or milliseconds of one another. However, based on human perception thresholds, system performance requirements, and/or other such criteria, an error tolerance referred to herein as a "predefined time threshold" may be defined that may help controller 100 determine whether 3D sub-frames 502 are close enough to simultaneous to be treated as such. The predefined time threshold may be any suitable number. For example, if system requirements associated with a particular volumetric frame capture system indicate that 30 volumetric frames per second are to be captured, the predefined time threshold may be calculated as the maximum amount of time in which each set of 3D sub-frames must be captured in order for 30 such sets to be captured per second (i.e., 1000 ms divided by 30 ms, or approximately 33 ms per set). As another example, it may be determined that users prefer (e.g., are capable of perceiving, are comfortable with, etc.) a particular number of frames per second, and the predefined time threshold may be calculated based on that particular number of frames per second.

In some examples, controller 100 may determine that timestamps 504 are more than the predetermined time threshold apart. For example, subsequent to the formation of the volumetric frame of real-world scene 302 based on one set of 3D sub-frames 502 (i.e., including the first and second 3D sub-frames) as described above, controller 100 may transmit commands to the 3D capture devices to capture another set of 3D sub-frames 502 (e.g., for a subsequent volumetric frame) and may receive the new set of 3D sub-frames 502. More particularly, controller 100 may transmit (e.g., to the first 3D capture device) a third command to capture a third 3D sub-frame representative of real-world scene 302 from the first vantage point, receive the third 3D sub-frame from the first 3D capture device based on the third command, transmit (e.g., to the second 3D capture device) a fourth command to capture a fourth 3D sub-frame representative of real-world scene 302 from the second vantage point, and receive the fourth 3D sub-frame from the second 3D capture device based on the fourth command.

In response to receiving the new set of 3D sub-frames 502 (i.e., including the third and fourth 3D sub-frames described above), controller 100 may determine that the timestamps of the new set of 3D sub-frames 502 are not within the predefined time threshold from one another (i.e., are captured too far apart to be considered to be synchronous). More particularly, controller 100 may determine that a third timestamp (e.g., an earliest timestamp) associated with a capture of the third 3D sub-frame is more than the predefined time threshold from a fourth timestamp (e.g., a latest timestamp) associated with a capture of the fourth 3D sub-frame. In response to this determination, controller 100 may abstain from providing the third and fourth 3D sub-frames for use in forming an additional volumetric frame of the real-world scene. This may save controller 100 (or another system or device to which the 3D sub-frames are provided for use in forming the additional volumetric frame) from having to perform unneeded processing, and the new set of 3D sub-frames may be dropped since they are captured too far apart to be considered synchronous. Specifically, in response to the abstaining, controller 100 may replace (e.g., in a sequence of volumetric frames including positions designated for the previous volumetric frame and the new volumetric frame) the new volumetric frame with the previous volumetric frame in the position in the sequence designated for the new volumetric frame. In other words, controller 100 may drop the new 3D sub-frames and simply replace the volumetric frame that would have been formed based on the new 3D sub-frames with a volumetric frame that has already been successfully formed from previous synchronous 3D sub-frames. In embodiments where the forming of volumetric frames is done by a system or device other than controller 100 (e.g., a downstream system or device such as a media player device used by an end user), the processing benefits described above may similarly accrue to the other system or device to which the 3D sub-frames would be provided but are instead abstained from being provided (i.e., dropped).

Conversely, in examples where the first timestamp is determined to be less than the predefined time threshold from the second timestamp (i.e., where the set of 3D sub-frames 502 are captured close enough in time to be considered synchronous), controller 100 may provide this synchronous set of 3D sub-frames 502 to allow 3D sub-frames 502 to be a analyzed, stored, combined, and/or for a volumetric frame to be formed based on 3D sub-frames 502 in any manner as may serve a particular implementation. For example, controller 100 may align the set of 3D sub-frames (i.e., including aligning the first and second 3D sub-frames) based on one or more predetermined alignment parameters to form a volumetric frame of real-world scene 302.

Controller 100 (or another system or device to which controller 100 may provide a set of 3D sub-frames) may align the set of 3D sub-frames to form a volumetric frame of a real-world scene in any manner as may serve a particular implementation. For example, referring to the first and second 3D sub-frames described above (which may be representative of any of various 3D sub-frames in a set of 3D sub-frames such as 3D sub-frames 502 in FIG. 5), controller 100 may align the first and second 3D sub-frames by performing various operations that will now be described. First, controller 100 may identify (e.g., calculate, receive, load from memory, download, etc.) a first set of alignment parameters for the first 3D capture device and a second set of alignment parameters for the second 3D capture device. The first and second sets of alignment parameters may both be included in the one or more predetermined alignment parameters referred to above (i.e., the one or more predetermined alignment parameters used for aligning all of the 3D sub-frames with one another).

The alignment parameters in the one or more predetermined alignment parameters (i.e., as well as in the first and second sets of predetermined alignment parameters) may include any parameters as may facilitate alignment of 3D sub-frames in a particular implementation. For example, the alignment parameters may be representative of the plurality of 3D capture devices and/or the fixed positions (and associated vantage points) at which the plurality of 3D capture devices are disposed. In some examples, the one or more predetermined alignment parameters may include intrinsic parameters representative of at least one characteristic of each 3D capture device in the plurality of 3D capture device, extrinsic parameters representative of a relative positioning of each 3D capture device in the plurality of 3D capture devices with respect to other 3D capture devices in the plurality of 3D capture devices, or other suitable alignment parameters.

As used herein, "intrinsic parameters" may refer to any parameters, coefficients, or other data representative of characteristics of one or more of the 3D capture devices in the plurality of video capture devices. For example, intrinsic parameters may represent a principal point or center location of a particular 3D capture device (e.g., using a local coordinate system specific to the 3D capture device or a global coordinate system that is shared by all of the 3D capture devices), a focal length of the particular 3D capture device, an image sensor format, lens distortion parameters, and/or any other parameters or data representative of 3D capture device characteristics as may serve a particular implementation.

Similarly, "extrinsic parameters," as used herein, may refer to any parameters, coefficients, or other data representative of the relative position of each 3D capture device with respect to the other 3D capture devices. For example, extrinsic parameters may designate transformations from respective local coordinate systems specific to each particular 3D capture device to a global coordinate system (i.e., a coordinate system universal to all of the 3D capture devices). As such, extrinsic parameters may represent a center location of each 3D capture device in the global coordinate system, as well as a rotation matrix indicative of the relative rotation of each 3D capture device, and any other parameters or data representative of the relative positions of the 3D capture devices as may serve a particular implementation.

The one or more predetermined alignment parameters may include any suitable data, and may be formatted, stored, represented, transmitted, etc., in any manner that may serve a particular implementation. For example, the alignment parameters may be represented in a file (e.g., along with other types of data such as calibration data, metadata, etc.) that employs any suitable data representation format or data description language (e.g., XML, JSON, plain text, etc.). Moreover, the alignment parameters may be predetermined (i.e., determined prior to being used in operation, such as during a calibration or configuration setup phase) in any suitable manner.

Figure 6:
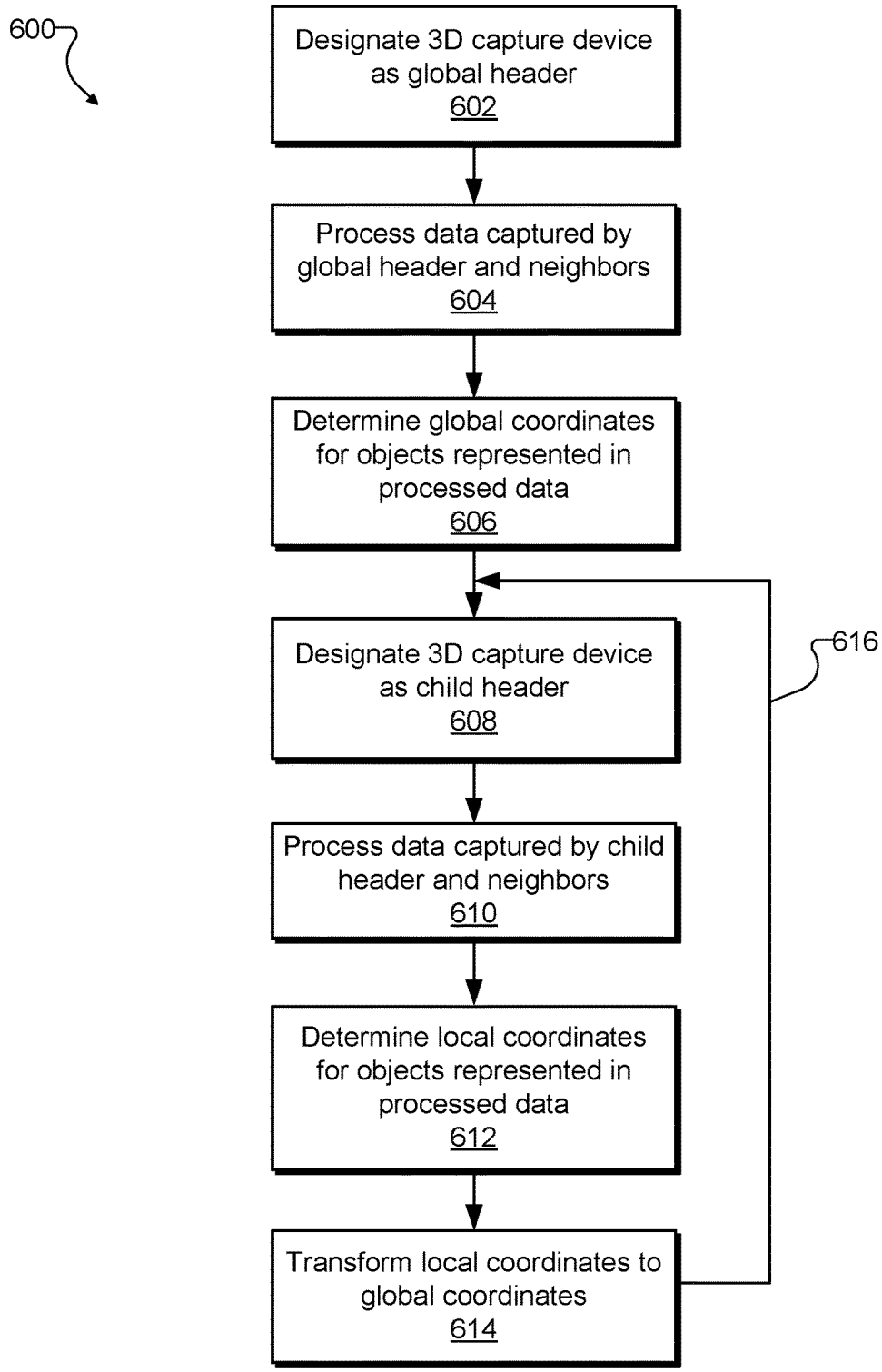
FIG. 6 illustrates an exemplary method for determining alignment parameters for a plurality of 3D capture devices in a configuration such as the configuration illustrated in FIG. 3 according to principles described herein.

For example, FIG. 6 illustrates an exemplary method 600 for determining alignment parameters for a plurality of 3D capture devices in a configuration such as configuration 300 (illustrated above in relation to FIG. 3). While FIG. 6 illustrates exemplary operations according to one embodiment, other embodiments may omit, add to, reorder, and/or modify any of the operations shown in FIG. 6. While controller 100 will be described as performing method 600 in the following example, it will be understood that one or more of the operations shown in FIG. 6 may be performed by controller 100, system 200, another suitable device or system (e.g., a calibration system), or any combination thereof. Moreover, it will be understood that, in certain examples, the following operations may be performed during a configuration setup phase or a calibration phase, as opposed to during normal operation of controller 100.

In operation 602, controller 100 may designate a particular 3D capture device as a global header. In other words, a particular 3D capture device (e.g., 3D capture device 402 at position 306-1 in one example) may be selected as a primary 3D capture device around which the global coordinate system will be based. Controller 100 may designate the 3D capture device arbitrarily (i.e., randomly) or using any criteria as may serve a particular implementation.

In operation 604, controller 100 may process data captured by the selected global header (e.g., 3D capture device 402 in this example) and by neighboring 3D capture devices of the global header (e.g., the 3D capture devices at positions adjacent to or near position 306-1, such as the 3D capture devices at positions 306-8, 306-7, 306-2, 306-3, etc.). More particularly, an easily recognizable pattern (e.g., a checkerboard pattern) may be presented to the global header (i.e., 3D capture device 402) such that the pattern may be analyzed from vantage point 308-1 as well as from neighboring vantage points 308. The data captured by each of the 3D capture devices may be processed to determine how the 3D capture devices (e.g., including the respective lenses of the 3D capture devices, etc.) may distort or warp images such that image data provided by each 3D capture device may be undistorted, flattened, or the like (e.g., based on intrinsic parameters associated with each 3D capture device) before being combined and aligned with image data from other 3D capture devices.

In operation 606, controller 100 may determine global coordinates for objects represented in the data processed by the global header and the neighboring 3D capture devices in operation 604. In other words, local coordinate systems for each neighboring 3D capture device may be transformed to the global coordinate system of the global header.

In operation 608, controller 100 may designate one or more 3D capture devices as child headers of the global header. For example, if transformation parameters have been determined to convert depth data captured by 3D capture devices disposed at positions 306-7 and 306-3 into the global coordinate system, then these 3D capture devices (i.e., at position 306-7 to the left of the global header and at position 306-3 to the right of the global header) may be designated as child headers of the global header at position 306-1.

As such, in operation 610, controller 100 may process data captured by the newly designated child headers (i.e., 3D capture devices disposed at positions 306-7 and 306-3) and their neighboring 3D capture devices (e.g., including 3D capture devices at positions 306-4, 306-5, and 306-6), similarly as the data was processed in operation 604. For example, the easily recognizable pattern may be moved and reoriented (e.g., turned) to face each of the child headers in turn such that the child headers and the 3D capture devices neighboring the child headers may capture the pattern and process the data as described above.

In operation 612, controller 100 may determine local coordinates for objects represented in the data processed in operation 610. In other words, as in operation 606, the local coordinate systems unique to each 3D capture device neighboring each child header may be transformed to the local coordinate system of the child header.

As such, in operation 614, controller 100 may transform the local coordinate systems of each child header to the global coordinate system, such that the global header and its neighbors, as well as each child header and its respective neighbors are all associated with transformation parameters allowing depth data captured by each of these 3D capture devices to be mapped onto the same global coordinate system.

In the example described above, each of the 3D capture devices in configuration 300 has been associated with transformation parameters based on the global header or a child header. However, if additional 3D capture devices are present, arrow 616 illustrates that operations 608 through 614 may be repeated as necessary to add additional child headers until each 3D capture device in the plurality of 3D capture devices has been associated with transformation parameters to convert to the global coordinate system.

Once the respective sets of predetermined alignment parameters have been identified (e.g., based on previous calibration performed using method 600) for each of the first and second 3D capture devices, controller 100 may determine (e.g., based on the first set of alignment parameters) a first set of global coordinates corresponding to one or more objects included within the real-world scene and represented within the first 3D sub-frame. For example, controller 100 may determine global coordinates associated with each point on the surface of object 304 in real-world scene 302 from the first vantage point of the first 3D capture device. Similarly, controller 100 may determine (e.g., based on the second set of alignment parameters) a second set of global coordinates corresponding to one or more objects included within the real-world scene and represented within the second 3D sub-frame. For example, controller 100 may determine global coordinates associated with each point on the surface of object 304 from the second vantage point of the second 3D capture device.

Based on the first and second set of global coordinates, controller 100 may determine that the one or more objects represented within the first 3D sub-frame are the same as the one or more objects represented within the second 3D sub-frame but are represented as viewed from different vantage points. For example, controller 100 may determine (e.g., using feature matching techniques or the like) that the same surfaces of the same object 304 are represented in both the first and second 3D sub-frames from different vantage points (i.e., the first and second vantage points, respectively). Based on the determining that the one or more objects represented within the first 3D sub-frame are the same as the one or more objects represented within the second 3D sub-frame, controller 100 may generate a 3D model of the one or more objects (e.g., object 304) based on data included within both the first 3D sub-frame representing the one or more objects from the first vantage point and within the second 3D sub-frame representing the one or more objects from the second vantage point.

Synchronizing the different 3D sub-frames being aligned assists in the aligning and formation of the volumetric frame. For example, if an object is moving through a real-world scene and 3D sub-frames representative of the moving object are captured at significantly different times, it may be difficult or may produce erroneous results to try to align the object in different 3D sub-frames. Accordingly, an application may be configured to continuously execute on controller 100 to monitor and continuously identify errors within an alignment of the first and second 3D sub-frames (e.g., caused by inaccuracies and imperfections in performing the operations of method 600, by one of 3D capture devices accidentally being displaced from its position or vantage point, by a change in the ambient lighting in the room, etc.), and to refine the alignment of the first and second 3D sub-frames in order to correct the identified errors and/or one or more alignment parameters included within the one or more predetermined alignment parameters. In some examples, the application may be implemented by a program that executes in the background (e.g., one or more background threads, a feedback loop thread, etc.) or that otherwise operates concurrently with other operations performed by controller 100 as described herein. By continually correcting, refining, and perfecting the alignment of the 3D capture devices in this way, the application may help mitigate subsequent alignment errors corresponding to (e.g., caused by) the detected error.

As mentioned above, in some examples, the volumetric frame capture controllers and volumetric frame capture systems for capturing a plurality of 3D sub-frames for use in generating a volumetric frame of a real-world scene described herein (e.g., controller 100, system 200, etc.) may be used to generate virtual reality media content to be experienced by users. For example, in addition to the operations described above, controller 100, system 200, or a virtual reality media content provider system that is associated with (e.g., that includes) controller 100 and/or system 200 may further generate and provide virtual reality media content based on the volumetric frames that controller 100 forms. Specifically, a volumetric data stream representative of a dynamic volumetric model of the real-world scene may be generated (e.g., by controller 100) based on a plurality of volumetric frames including the volumetric frame. The dynamic volumetric model may be configured to be used to generate virtual reality media content representative of the real-world scene as experienced from a dynamically selectable vantage point corresponding to an arbitrary location within the real-world scene. For example, the dynamically selectable vantage point may be selected by a user of a media player device while the user is experiencing the real-world scene using the media player device. Moreover, the virtual reality media content may be provided (e.g., by the virtual reality media content provider system that includes controller 100), to the media player device to allow the user to experience the real-world scene from the dynamically selectable vantage point corresponding to the arbitrary location within the real-world scene.

Figure 7:
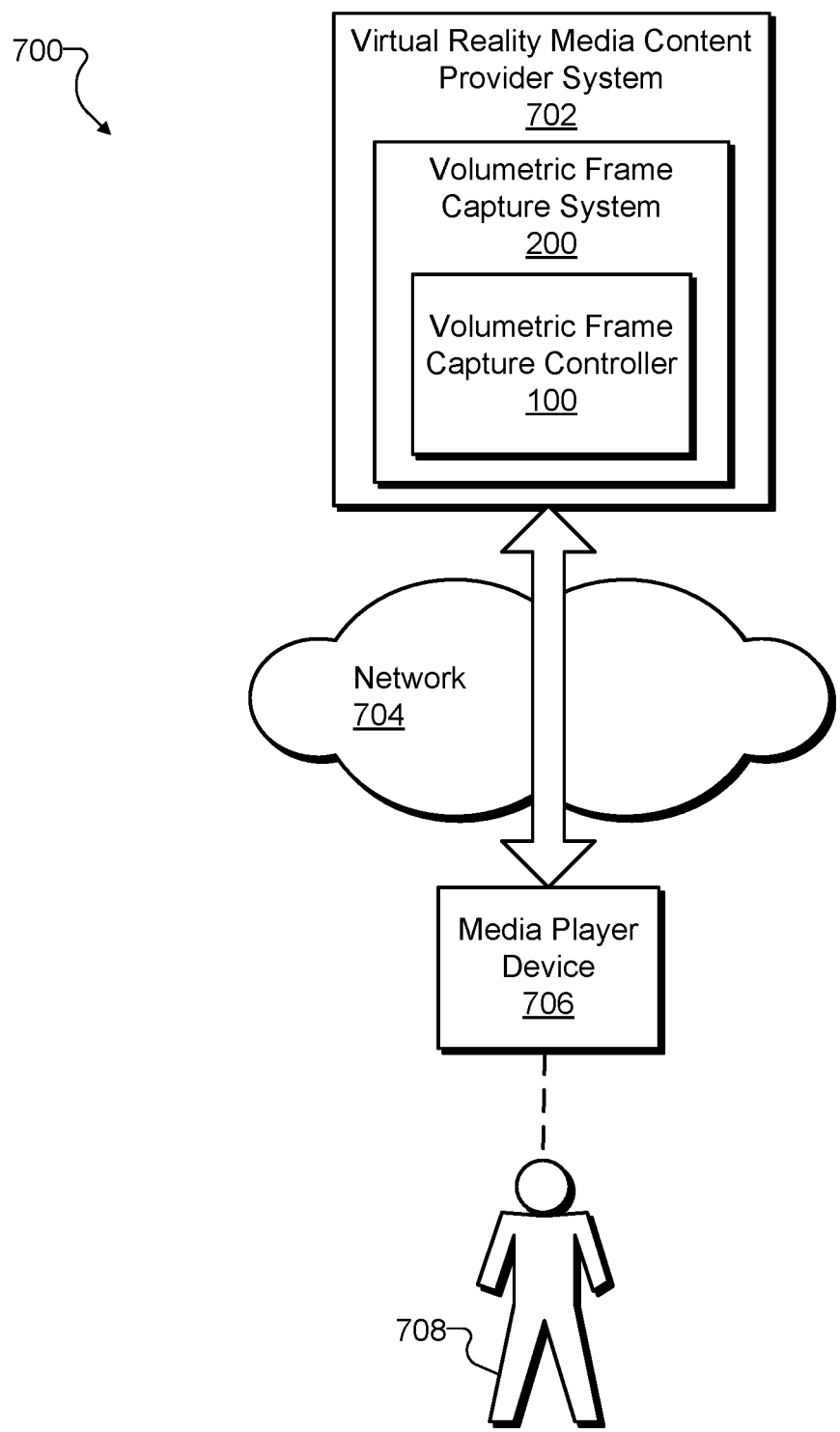
FIG. 7 illustrates an exemplary configuration in which the volumetric frame capture controller of FIG. 1 generates a volumetric data stream used to generate virtual reality media content that is provided to an exemplary media player device used by a user to experience the real-world scene according to principles described herein.

To illustrate, FIG. 7 shows an exemplary configuration 700 in which controller 100 generates a volumetric data stream used to generate virtual reality media content that is provided to an exemplary media player device used by a user to virtually experience the real-world scene. More specifically, as shown, configuration 700 includes a virtual reality media content provider system 702 ("provider system 702") that includes, implements, or is otherwise associated with volumetric frame capture system 200, which, in turn, includes volumetric frame capture controller 100. As shown, provider system 702 may be communicatively coupled, by way of a network 704, with a media player device 706 that is associated with a user 708.

After providing the 3D sub-frames for use in forming volumetric frames representative of real-world scene 302, and after the volumetric frames have been formed, controller 100 may generate a real-time volumetric data stream representative of a dynamic volumetric model of the surfaces of object 304 within real-world scene 302. A dynamic volumetric model of an object may include and/or be generated based both on 1) the depth data representing where and how the object is positioned in 3D space at a particular time, or with respect to time over a particular time period, and on 2) synchronous 2D video data mapped onto a positional model (e.g., a wireframe model of the object derived from the depth data) to represent how the object appeared at the particular time or with respect to time over the particular time period. As such, dynamic volumetric models may be 3D models including three spatial dimensions or four-dimensional ("4D") models that include the three spatial dimensions as well as a temporal dimension.

In some examples, controller 100 may generate a data stream (e.g., a real-time data stream) representative of the dynamic volumetric model of the surfaces of object 304 included in real-world scene 302. Such a data stream may be referred to herein as a "volumetric data stream." Controller 100 may generate the volumetric data stream in real time such that users not physically located within or around real-world scene 302 may be able to experience real-world scene 302 live, in real time, via virtual reality media content representative of real-world scene 302. Accordingly, the dynamic volumetric model of the surfaces of object 304 may be configured to be used to generate virtual reality media content representative of real-world scene 302. The virtual reality media content may be generated by provider system 700 (e.g., by controller 100, system 200, or, in some examples, by different processing components included within provider system 700).

Virtual reality media content may be generated (e.g., based on a real-time volumetric data stream generated from a dynamic volumetric model of the surfaces of object 304 and/or other objects within real-world scene 302) and then distributed by way of network 704 to one or more media player devices such as media player device 706 associated with user 708. For example, provider system 700 may provide the virtual reality media content to media player device 706 so that user 708, who may not be physically located near real-world scene 302 but who may wish to experience, for example, an event occurring within real-world scene 302, may experience real-world scene 302 virtually using media player device 706. As mentioned above, it may be desirable for user 708 to experience real-world scene 302 live (e.g., in real time as it is occurring with as small a delay as possible). Accordingly, provider system 700 may provide the virtual reality media content representative of real-world scene 302 to media player device 706 in real time.

In some examples, it may be undesirable for user 708, who may experience real-world scene 302 virtually (e.g., using media player device 706 to present virtual reality media content provided by provider system 700), to be limited to one or more discrete positions within the immersive virtual reality world representative of real-world scene 302. As such, provider system 700 may provide the virtual reality media content representative of real-world scene 302 as experienced from a dynamically selectable vantage point corresponding to an arbitrary location within real-world scene 302. The dynamically selectable vantage point may be selected by user 708 while user 708 is experiencing real-world scene 302 using media player device 706.

As used herein, an "arbitrary location" may refer to any point in space at the real-world event. For example, arbitrary locations are not limited to fixed positions (e.g., fixed positions 306) surrounding real-world scene 302, but also include all the positions between positions 306 and even positions where 3D capture devices may not be able to be positioned (e.g., in the midst of real-world scene 302 where the 3D capture devices could interfere with events occurring in real-world scene 302). Moreover, arbitrary locations may be associated with arbitrary vantage points (i.e., viewing angles, etc.) not limited to aligning with any particular vantage point 308. In some examples, such arbitrary locations may correspond to the most desirable vantage points within real-world scene 302. For instance, if real-world scene 302 includes a basketball game, 3D capture devices may not be allowed to be positioned in the middle of the basketball court because the 3D capture devices would interfere with gameplay of the basketball game. However, user 708 may dynamically select vantage points from which to experience the game that are in any arbitrary location on the basketball court. For example, the user may dynamically select his or her vantage points to follow the basketball up and down the basketball court and experience the basketball game as if standing on the basketball court in the middle of the action of the game. In other words, for example, while the 3D capture device may be positioned at fixed positions surrounding the basketball court, but may not be positioned directly on the court so as not to interfere with gameplay of the basketball game, user 708 may dynamically select vantage points from which to experience the game that are associated with any arbitrary position on the basketball court.

Network 704 may include any provider-specific wired or wireless network (e.g., a cable or satellite carrier network or a mobile telephone network), the Internet, wide area network, or any other suitable network. Data may flow between provider system 700 and media player device 706 (as well as other media player devices not explicitly shown) using any communication technologies, devices, media, and protocols as may serve a particular implementation.

Media player device 706 may be used by user 708 to access and experience virtual reality media content received from provider system 700. To this end, media player device 706 may include or be implemented by any device capable of presenting a field of view of an immersive virtual reality world (e.g., an immersive virtual reality world representative of real-world scene 302) and detecting user input from user 708 to dynamically update the immersive virtual reality world presented within the field of view as user 708 experiences the immersive virtual reality world.

Figure 8:
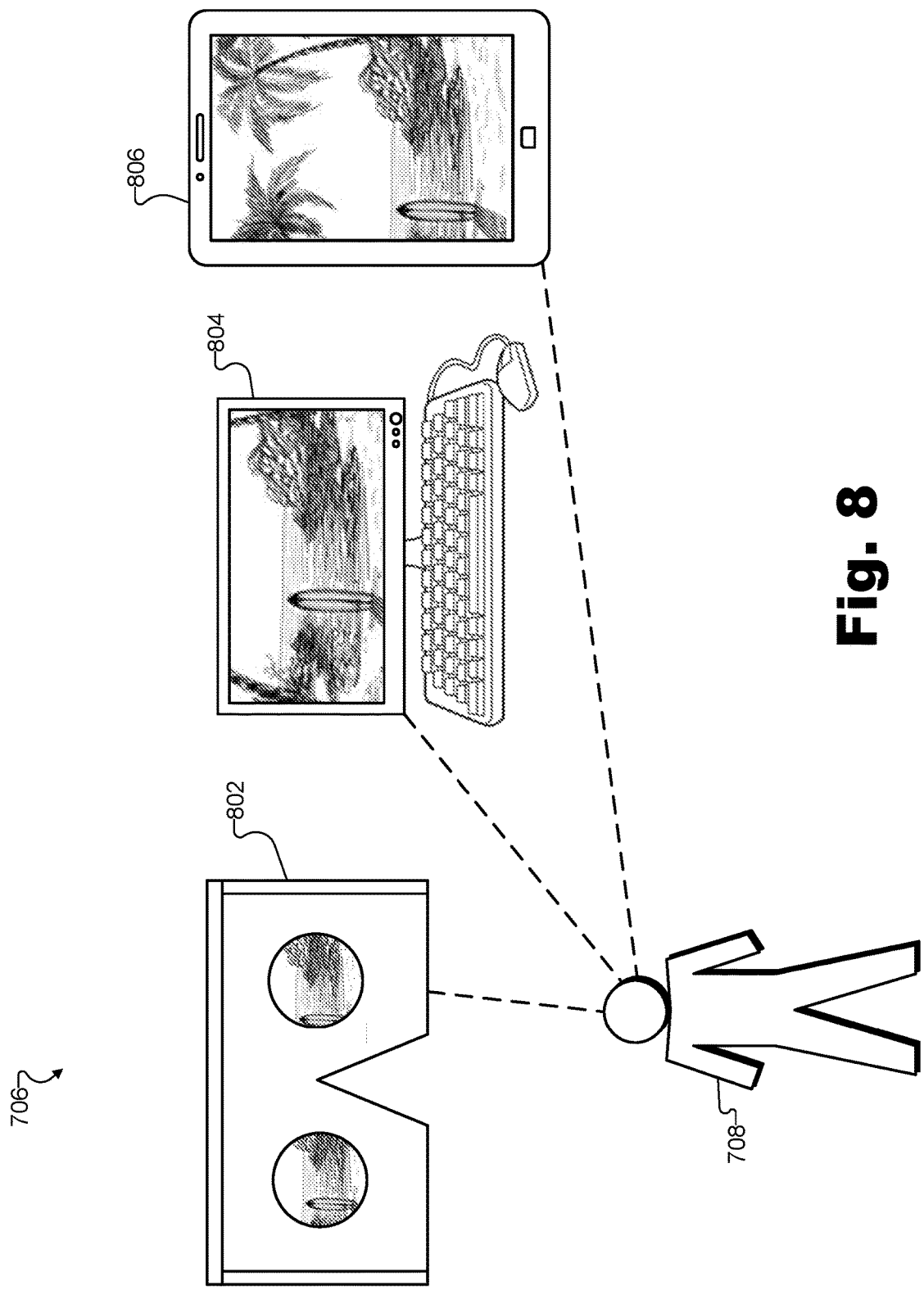
FIG. 8 illustrates various exemplary media player devices that may be used by a user to experience virtual reality media content according to principles described herein.

To illustrate, for example, FIG. 8 shows various exemplary types of media player devices 706 that may be used by user 708 to experience virtual reality media content. Specifically, as shown, media player device 706 may take one of several different form factors such as a head-mounted virtual reality device 802 (e.g., a virtual reality gaming device) that includes a head-mounted display screen, a personal computer device 804 (e.g., a desktop computer, laptop computer, etc.), a mobile or wireless device 806 (e.g., a smartphone, a tablet device, etc., possibly mounted to the head of user 708 by means of a cardboard apparatus, or the like), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 708.

Figure 9:
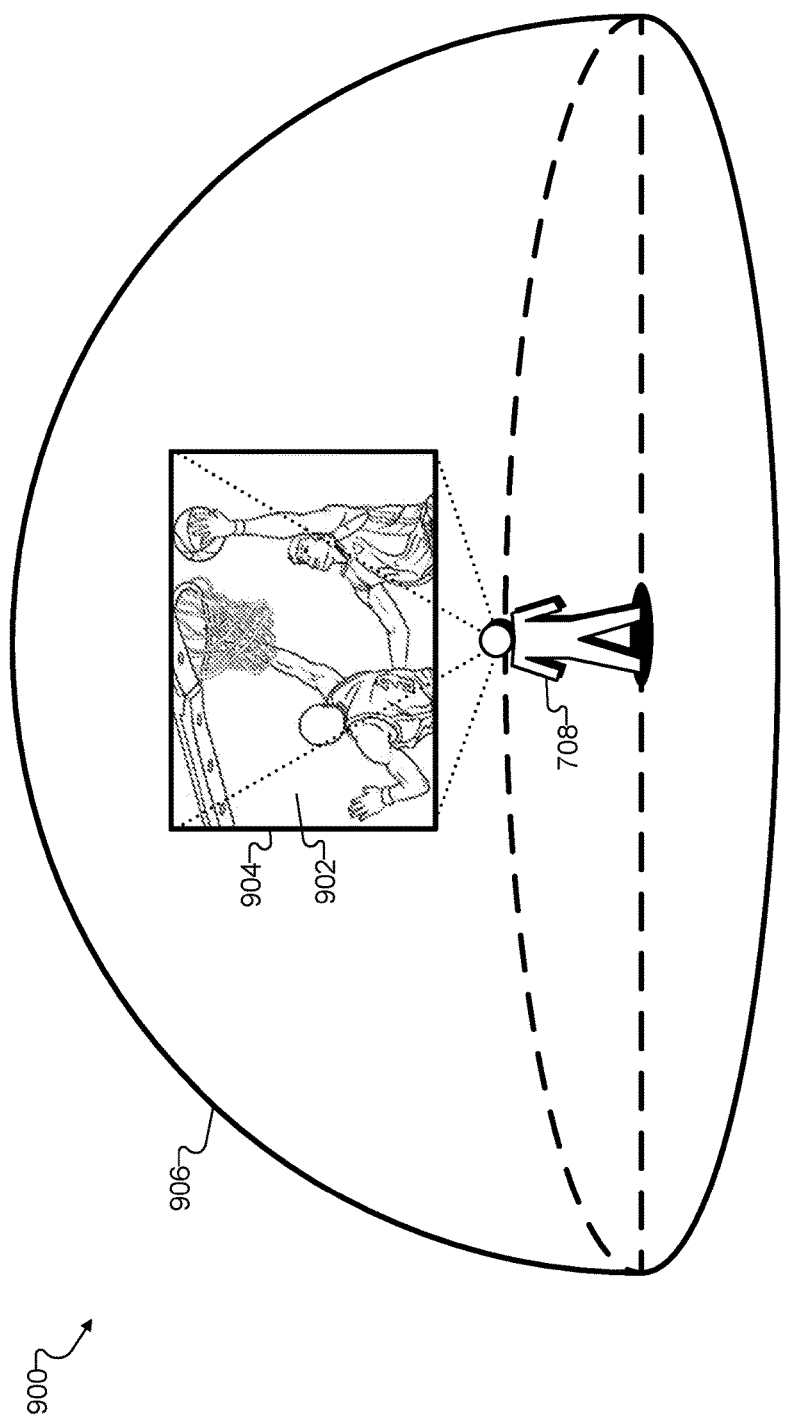
FIG. 9 illustrates an exemplary virtual reality experience in which a user is presented with exemplary virtual reality media content representative of a real-world scene as experienced from a dynamically selectable vantage point corresponding to an exemplary arbitrary location within the real-world scene according to principles described herein.

FIG. 9 illustrates an exemplary virtual reality experience 900 in which user 708 is presented with exemplary virtual reality media content representative of a real-world scene as experienced from a dynamically selectable vantage point corresponding to an exemplary arbitrary location within the real-world scene. Specifically, virtual reality media content 902 is presented within a field of view 904 that shows the real-world scene from a vantage point corresponding to an arbitrary location right underneath a basketball standard within the real-world scene where a shot is being made. An immersive virtual reality world 906 based on the real-world event may be available for the viewer to experience by providing user input (e.g., head movements, keyboard input, etc.) to look around and/or to move around (i.e., dynamically select a vantage point from which to experience) immersive virtual reality world 906.

For example, field of view 904 may provide a window through which user 708 may easily and naturally look around immersive virtual reality world 906. Field of view 904 may be presented by media player device 706 (e.g., on a display screen of media player device 706) and may include video depicting objects surrounding the user within immersive virtual reality world 906. Additionally, field of view 904 may dynamically change in response to user input provided by the user as the user experiences the immersive virtual reality world. For example, media player device 706 may detect user input (e.g., moving or turning the display screen upon which field of view 904 is presented). In response, field of view 904 may display different objects and/or objects seen from a different vantage point or position in place of the objects seen from the previous vantage point or position.

In FIG. 9, immersive virtual reality world 906 is illustrated as a semi-sphere, indicating that user 708 may look in any direction within immersive virtual reality world 906 that is substantially forward, backward, left, right, and/or up from the vantage point of the location under the basketball standard that user 708 has currently selected. In other examples, immersive virtual reality world 906 may include an entire 360° by 180° sphere such that user 708 may also look down. Additionally, user 708 may move around to other locations within immersive virtual reality world 906 (i.e., dynamically selecting different dynamically selectable vantage points of the real-world event). For example, user 708 may select a vantage point at half court, a vantage point from the free-throw line facing the basketball standard, a vantage point suspended above the basketball standard, or the like.

Figure 10:
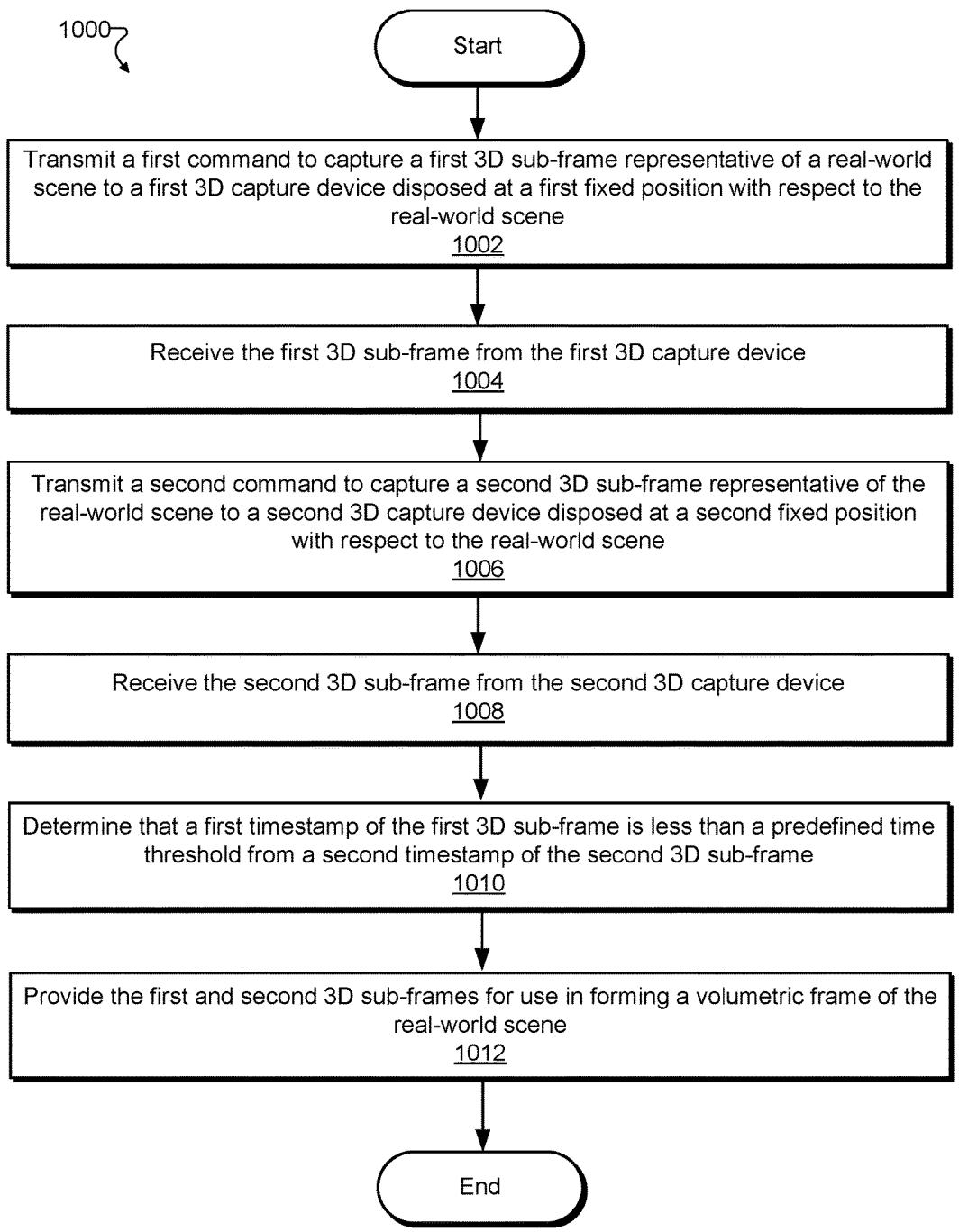
FIG. 10 illustrates an exemplary method for capturing a plurality of 3D sub-frames for use in forming a volumetric frame of a real-world scene according to principles described herein.

FIG. 10 illustrates an exemplary method 1000 for capturing a plurality of 3D sub-frames for use in forming a volumetric frame of a real-world scene. While FIG. 10 illustrates exemplary operations according to one embodiment, other embodiments may omit, add to, reorder, and/or modify any of the operations shown in FIG. 10. One or more of the operations shown in FIG. 10 may be performed by controller 100, system 200, and/or any implementation thereof.

In operation 1002, a volumetric frame capture controller (e.g., included within a volumetric frame capture system) may transmit a first command to a first 3D capture device disposed at a first fixed position with respect to a real-world scene. The first command may be for the first 3D capture device to capture a first 3D sub-frame representative of the real-world scene from a first vantage point associated with the first fixed position. Operation 1002 may be performed in any of the ways described herein.

In operation 1004, the volumetric frame capture controller may receive the first 3D sub-frame from the first 3D capture device based on the first command. Operation 1004 may be performed in any of the ways described herein.

In operation 1006, the volumetric frame capture controller may transmit a second command to a second 3D capture device disposed at a second fixed position with respect to the real-world scene. The second command may be for the second 3D capture device to capture a second 3D sub-frame representative of the real-world scene from a second vantage point associated with the second fixed position. Operation 1006 may be performed in any of the ways described herein.

In operation 1008, the volumetric frame capture controller may receive the second 3D sub-frame from the second 3D capture device based on the second command. Operation 1008 may be performed in any of the ways described herein.

In operation 1010, the volumetric frame capture controller may determine that a first timestamp associated with a capture of the first 3D sub-frame is less than a predefined time threshold from a second timestamp associated with a capture of the second 3D sub-frame. For example, the volumetric frame capture controller may make that determination in response to the receiving of the first and second 3D sub-frames in operations 1006 and 1008, respectively. Operation 1010 may be performed in any of the ways described herein.

In operation 1012, the volumetric frame capture controller may provide the first and second 3D sub-frames for use in forming a volumetric frame of the real-world scene. For example, the volumetric frame capture controller may provide the first and second 3D sub-frames in response to the determination in operation 1010 that the first timestamp is less than the predefined time threshold from the second timestamp. Operation 1012 may be performed in any of the ways described herein. For instance, operation 1012 may include aligning the first and second 3D sub-frames to form the volumetric frame of the real-world scene based on one or more predetermined alignment parameters.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be not implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
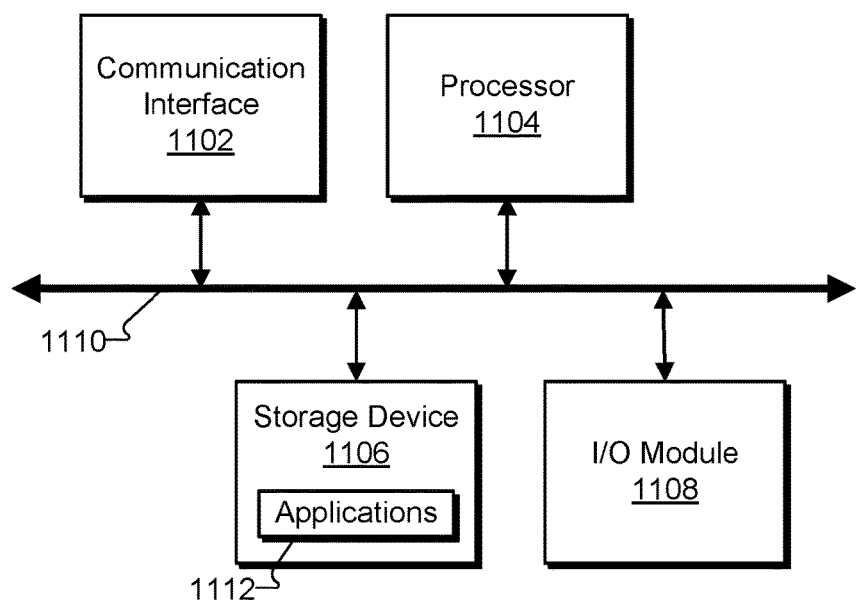
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual reality experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more operations or functions associated with 3D sub-frame capture facility 102 or 3D sub-frame processing facility 104 of controller 100 (see FIG. 1). Likewise, storage facility 106 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    transmitting, by a volumetric frame capture controller to a first three-dimensional (3D) capture device disposed at a first fixed position with respect to a real-world scene, a first command to capture a first 3D sub-frame representative of the real-world scene from a first vantage point associated with the first fixed position;
    receiving, by the volumetric frame capture controller from the first 3D capture device based on the first command, the first 3D sub-frame;
    transmitting, by the volumetric frame capture controller to a second 3D capture device disposed at a second fixed position with respect to the real-world scene, a second command to capture a second 3D sub-frame representative of the real-world scene from a second vantage point associated with the second fixed position;
    receiving, by the volumetric frame capture controller from the second 3D capture device based on the second command, the second 3D sub-frame;
    determining, by the volumetric frame capture controller in response to the receiving of the first and second 3D sub-frames, that a first timestamp associated with a capture of the first 3D sub-frame is less than a predefined time threshold from a second timestamp associated with a capture of the second 3D sub-frame;
    providing, by the volumetric frame capture controller in response to the determination that the first timestamp is less than the predefined time threshold from the second timestamp, the first and second 3D sub-frames for use in forming a first volumetric frame of the real-world scene;
    determining, by the volumetric frame capture controller subsequent to the formation of the first volumetric frame of the real-world scene, that a subsequent set of 3D sub-frames are captured more than the predefined time threshold apart;
    dropping, by the volumetric frame capture controller in response to the determination that the subsequent set of 3D sub-frames are captured more than the predefined time threshold apart, the subsequent set of 3D sub-frames by abstaining from providing the subsequent set of 3D sub-frames for use in forming a second volumetric frame of the real-world scene; and
    replacing, by the volumetric frame capture controller in response to the dropping of the subsequent set of 3D sub-frames, the second volumetric frame with the first volumetric frame within a sequence of volumetric frames, the replacing performed by including the first volumetric frame in a position designated for the second volumetric frame within the sequence.

2. The method of claim 1, further comprising:
    transmitting, by the volumetric frame capture controller to the first and second 3D capture devices, one or more additional commands to capture one or more additional 3D sub-frames representative of the real-world scene from the first and second vantage points;
    receiving, by the volumetric frame capture controller from the first and second 3D capture devices based on the one or more additional commands, the one or more additional 3D sub-frames; and
    providing, by the volumetric frame capture controller, the one or more additional 3D sub-frames for use in forming a third volumetric frame of the real-world scene, the third volumetric frame distinct from and subsequent to the first volumetric frame in the sequence of volumetric frames;
    wherein the receiving of the first and second 3D sub-frames is completed prior to the transmitting of the one or more additional commands to capture the one or more additional 3D sub-frames.

3. The method of claim 1, further comprising:
    generating, by the volumetric frame capture controller based on a plurality of volumetric frames including the first volumetric frame, a volumetric data stream representative of a dynamic volumetric model of the real-world scene, the dynamic volumetric model configured to be used to generate virtual reality media content representative of the real-world scene as experienced from a dynamically selectable vantage point corresponding to an arbitrary location within the real-world scene, the dynamically selectable vantage point selected by a user of a media player device while the user is experiencing the real-world scene using the media player device;
    wherein the virtual reality media content is provided, by a virtual reality media content provider system that includes the volumetric frame capture controller, to the media player device to allow the user to experience the real-world scene from the dynamically selectable vantage point corresponding to the arbitrary location within the real-world scene.

4. The method of claim 1, wherein the transmitting of the first and second commands, the receiving of the first and second 3D sub-frames, the determining that the first timestamp is less than the predefined time threshold from the second timestamp, and the providing of the first and second 3D sub-frames for use in forming the first volumetric frame of the real-world scene are each performed in real time as events occur within the real-world scene.

5. The method of claim 1, wherein:
    the first and second fixed positions are included in a plurality of fixed positions with respect to the real-world scene, the plurality of fixed positions surrounding the real-world scene along at least two dimensions associated with the real-world scene; and
    the first and second vantage points associated with the first and second fixed positions are included in a plurality of vantage points associated with the plurality of fixed positions surrounding the real-world scene along at least the two dimensions, the plurality of vantage points each angled inwardly toward the real-world scene.

6. The method of claim 1, wherein:
    the first and second 3D capture devices each include
        at least one two-dimensional (2D) video capture device configured to capture 2D video data representative of the real-world scene, and
        at least one depth capture device configured to capture depth data representative of the real-world scene;

the first 3D sub-frame includes a first frame of 2D video data and depth data representative of the real-world scene from the first vantage point; and the second 3D sub-frame includes a second frame of 2D video data and depth data representative of the real-world scene from the second vantage point.

7. The method of claim 1, wherein:

the subsequent set of 3D sub-frames includes a third 3D sub-frame representative of the real-world scene from the first vantage point and a fourth 3D sub-frame representative of the real-world scene from the second vantage point;

the method further comprises:

transmitting, by the volumetric frame capture controller to the first 3D capture device subsequent to the formation of the first volumetric frame of the real-world scene, a third command to capture the third 3D sub-frame;

receiving, by the volumetric frame capture controller from the first 3D capture device based on the third command, the third 3D sub-frame;

transmitting, by the volumetric frame capture controller to the second 3D capture device subsequent to the formation of the first volumetric frame of the real-world scene, a fourth command to capture the fourth 3D sub-frame;

receiving, by the volumetric frame capture controller from the second 3D capture device based on the fourth command, the fourth 3D sub-frame; and the determining that the subsequent set of 3D sub-frames are captured more than the predefined time threshold apart is performed by determining, in response to the receiving of the third and fourth 3D sub-frames, that a third timestamp associated with a capture of the third 3D sub-frame is more than the predefined time threshold from a fourth timestamp associated with a capture of the fourth 3D sub-frame.

8. The method of claim 1, wherein the providing of the first and second 3D sub-frames for use in forming the first volumetric frame of the real-world scene includes aligning, based on one or more predetermined alignment parameters, the first and second 3D sub-frames to form the first volumetric frame of the real-world scene by:

identifying a first set of alignment parameters for the first 3D capture device, the first set of alignment parameters included in the one or more predetermined alignment parameters;

identifying a second set of alignment parameters for the second 3D capture device, the second set of alignment parameters also included in the one or more predetermined alignment parameters;

determining, based on the first set of alignment parameters, a first set of global coordinates corresponding to one or more objects included within the real-world scene and represented within the first 3D sub-frame;

determining, based on the second set of alignment parameters, a second set of global coordinates corresponding to one or more objects included within the real-world scene and represented within the second 3D sub-frame;

determining, based on the first and second set of global coordinates, that the one or more objects represented within the first 3D sub-frame are the same as the one or more objects represented within the second 3D sub-frame but are represented as viewed from different vantage points; and generating, based on the determining that the one or more objects represented within the first 3D sub-frame are the same as the one or more objects represented within the second 3D sub-frame, a 3D model of the one or more objects based on data included within both the first 3D sub-frame representing the one or more objects from the first vantage point and the second 3D sub-frame representing the one or more objects from the second vantage point.

9. The method of claim 1, wherein the providing of the first and second 3D sub-frames includes:

aligning, based on one or more predetermined alignment parameters, the first and second 3D sub-frames to form the first volumetric frame of the real-world scene;

identifying an error within an alignment of the first and second 3D sub-frames; and refining at least one of the alignment of the first and second 3D sub-frames in order to correct the identified error, and an alignment parameter included within the one or more predetermined alignment parameters in order to mitigate subsequent errors corresponding to the error.

10. A system comprising:

one or more volumetric frame capture controllers communicatively coupled with a plurality of three-dimensional (3D) capture devices disposed at a plurality of fixed positions with respect to a real-world scene, each volumetric frame capture controller including one or more expansion bus controllers, one or more input/output (I/O) host controllers, and at least one physical computing device that transmits, to a first 3D capture device included in the plurality of 3D capture devices and disposed at a first fixed position included in the plurality of fixed positions, a first command to capture a first 3D sub-frame representative of the real-world scene from a first vantage point associated with the first fixed position, receives, from the first 3D capture device based on the first command, the first 3D sub-frame, transmits, to a second 3D capture device included in the plurality of 3D capture devices and disposed at a second fixed position included in the plurality of fixed positions, a second command to capture a second 3D sub-frame representative of the real-world scene from a second vantage point associated with the second fixed position, receives, from the second 3D capture device based on the second command, the second 3D sub-frame, determines, in response to the receipt of the first and second 3D sub-frames, that a first timestamp associated with a capture of the first 3D sub-frame is less than a predefined time threshold from a second timestamp associated with a capture of the second 3D sub-frame, provides, in response to the determination that the first timestamp is less than the predefined time threshold from the second timestamp, the first and second 3D sub-frames for use in forming a first volumetric frame of the real-world scene, determines, subsequent to the formation of the first volumetric frame of the real-world scene, that a subsequent set of 3D sub-frames are captured more than the predefined time threshold apart, drops, in response to the determination that the subsequent set of 3D sub-frames are captured more than the predefined time threshold apart, the subsequent set of 3D sub-frames by abstaining from providing the subsequent set of 3D sub-frames for use in forming a second volumetric frame of the real-world scene, and replaces, in response to the dropping of the subsequent set of 3D sub-frames, the second volumetric frame with the first volumetric frame within a sequence of volumetric frames, the replacing performed by including the first volumetric frame in a position designated for the second volumetric frame within the sequence;

wherein each of the one or more expansion bus controllers included within each of the one or more volumetric frame capture controllers is associated with one or more different I/O host controllers included within the one or more I/O host controllers, and each of the one or more I/O host controllers is associated with one or more different 3D capture devices included within the plurality of 3D capture devices.

11. The system of claim 10, wherein:

the one or more volumetric frame capture controllers is a plurality of volumetric frame capture controllers, the one or more expansion bus controllers is a plurality of expansion bus controllers, and the one or more I/O host controllers is a plurality of I/O host controllers;

each of the plurality of volumetric frame capture controllers is implemented as a separate server, each separate server communicatively coupled with the other separate servers by way of a network;

each of the plurality of expansion bus controllers included within each of the separate servers is implemented as a separate Peripheral Component Interconnect Express (PCIe) controller card plugged into the respective server with which the PCIe controller card is associated; and each of the plurality of I/O host controllers is implemented as a separate Universal Serial Bus (USB) host controller plugged into the respective PCIe controller card with which the USB host controller is associated.

12. A system comprising:

at least one physical computing device that transmits, to a first three-dimensional (3D) capture device disposed at a first fixed position with respect to a real-world scene, a first command to capture a first 3D sub-frame representative of the real-world scene from a first vantage point associated with the first fixed position;

receives, from the first 3D capture device based on the first command, the first 3D sub-frame;

transmits, to a second 3D capture device disposed at a second fixed position with respect to the real-world scene, a second command to capture a second 3D sub-frame representative of the real-world scene from a second vantage point associated with the second fixed position;

receives, from the second 3D capture device based on the second command, the second 3D sub-frame;

determines, in response to the receipt of the first and second 3D sub-frames, that a first timestamp associated with a capture of the first 3D sub-frame is less than a predefined time threshold from a second timestamp associated with a capture of the second 3D sub-frame;

provides, in response to the determination that the first timestamp is less than the predefined time threshold from the second timestamp, the first and second 3D sub-frames for use in forming a first volumetric frame of the real-world scene;

determines, subsequent to the formation of the first volumetric frame of the real-world scene, that a subsequent set of 3D sub-frames are captured more than the predefined time threshold apart;

drops, in response to the determination that the subsequent set of 3D sub-frames are captured more than the predefined time threshold apart, the subsequent set of 3D sub-frames by abstaining from providing the subsequent set of 3D sub-frames for use in forming a second volumetric frame of the real-world scene; and replaces, in response to the dropping of the subsequent set of 3D sub-frames, the second volumetric frame with the first volumetric frame within a sequence of volumetric frames, the replacing performed by including the first volumetric frame in a position designated for the second volumetric frame within the sequence.

13. The system of claim 12, wherein the at least one physical computing device further:

transmits, to the first and second 3D capture devices, one or more additional commands to capture one or more additional 3D sub-frames representative of the real-world scene from the first and second vantage points;

receives, from the first and second 3D capture devices based on the one or more additional commands, the one or more additional 3D sub-frames; and provides the one or more additional 3D sub-frames for use in forming a third volumetric frame of the real-world scene, the third volumetric frame distinct from and subsequent to the first volumetric frame in the sequence of volumetric frames;

wherein the receipt of the first and second 3D sub-frames is completed prior to the transmission of the one or more additional commands to capture the one or more additional 3D sub-frames.

14. The system of claim 12, wherein:

the at least one physical computing device further generates, based on a plurality of volumetric frames including the first volumetric frame, a volumetric data stream representative of a dynamic volumetric model of the real-world scene, the dynamic volumetric model configured to be used to generate virtual reality media content representative of the real-world scene as experienced from a dynamically selectable vantage point corresponding to an arbitrary location within the real-world scene, the dynamically selectable vantage point selected by a user of a media player device while the user is experiencing the real-world scene using the media player device; and the virtual reality media content is provided, by a virtual reality media content provider system that includes the volumetric frame capture controller, to the media player device to allow the user to experience the real-world scene from the dynamically selectable vantage point corresponding to the arbitrary location within the real-world scene.

15. The system of claim 12, wherein the at least one physical computing device performs the transmission of the first and second commands, the receipt of the first and second 3D sub-frames, the determination that the first timestamp is less than the predefined time threshold from the second timestamp, and the providing of the first and second 3D sub-frames for us in forming the first volumetric frame of the real-world scene in real time as events occur within the real-world scene.

16. The system of claim 12, wherein:
the first and second fixed positions are included in a plurality of fixed positions with respect to the real-world scene, the plurality of fixed positions surrounding the real-world scene along at least two dimensions associated with the real-world scene; and
the first and second vantage points associated with the first and second fixed positions are included in a plurality of vantage points associated with the plurality of fixed positions surrounding the real-world scene along at least the two dimensions, the plurality of vantage points each angled inwardly toward the real-world scene.

17. The system of claim 12, wherein:
the first and second 3D capture devices each include
    at least one two-dimensional (2D) video capture device configured to capture 2D video data representative of the real-world scene, and
    at least one depth capture device configured to capture depth data representative of the real-world scene;
the first 3D sub-frame includes a first frame of 2D video data and depth data representative of the real-world scene from the first vantage point; and
the second 3D sub-frame includes a second frame of 2D video data and depth data representative of the real-world scene from the second vantage point.

18. The system of claim 12, wherein:
the subsequent set of 3D sub-frames includes a third 3D sub-frame representative of the real-world scene from the first vantage point and a fourth 3D sub-frame representative of the real-world scene from the second vantage point;
the at least one physical computing device further:
    transmits, to the first 3D capture device subsequent to the formation of the first volumetric frame of the real-world scene, a third command to capture the third 3D sub-frame;
    receives, from the first 3D capture device based on the third command, the third 3D sub-frame;
    transmits, to the second 3D capture device subsequent to the formation of the first volumetric frame of the real-world scene, a fourth command to capture the fourth 3D sub-frame;
    receives, from the second 3D capture device based on the fourth command, the fourth 3D sub-frame; and
the at least one physical computing device determines that the subsequent set of 3D sub-frames are captured more than the predefined time threshold apart by determining, in response to the receipt of the third and fourth 3D sub-frames, that a third timestamp associated with a capture of the third 3D sub-frame is more than the predefined time threshold from a fourth timestamp associated with a capture of the fourth 3D sub-frame.

19. The system of claim 12, wherein the at least one physical computing device provides the first and second 3D sub-frames for use in forming the first volumetric frame of the real-world scene by aligning, based on one or more predetermined alignment parameters, the first and second 3D sub-frames to form the first volumetric frame of the real-world scene by:
    identifying a first set of alignment parameters for the first 3D capture device, the first set of alignment parameters included in the one or more predetermined alignment parameters;
    identifying a second set of alignment parameters for the second 3D capture device, the second set of alignment parameters also included in the one or more predetermined alignment parameters;
    determining, based on the first set of alignment parameters, a first set of global coordinates corresponding to one or more objects included within the real-world scene and represented within the first 3D sub-frame;
    determining, based on the second set of alignment parameters, a second set of global coordinates corresponding to the one or more objects included within the real-world scene and represented within the second 3D sub-frame;
    determining, based on the first and second set of global coordinates, that the one or more objects represented within the first 3D sub-frame are the same as the one or more objects represented within the second 3D sub-frame but are represented as viewed from different vantage points; and
    generating, based on the determining that the one or more objects represented within the first 3D sub-frame are the same as the one or more objects represented within the second 3D sub-frame, a 3D model of the one or more objects based on data included within both the first 3D sub-frame representing the one or more objects from the first vantage point and the second 3D sub-frame representing the one or more objects from the second vantage point.

20. The system of claim 12, wherein the providing of the first and second 3D sub-frames by the at least one physical computing device includes:
    aligning, based on one or more predetermined alignment parameters, the first and second 3D sub-frames to form the first volumetric frame of the real-world scene;
    identifying an error within an alignment of the first and second 3D sub-frames; and
    refining at least one of
        the alignment of the first and second 3D sub-frames in order to correct the identified error, and
        an alignment parameter included within the one or more predetermined alignment parameters in order to mitigate subsequent errors corresponding to the error.

* * * * *